(12) United States Patent
Okamoto

(10) Patent No.: US 11,526,126 B2
(45) Date of Patent: Dec. 13, 2022

(54) IMAGE FORMING APPARATUS

(71) Applicant: KYOCERA Document Solutions Inc., Osaka (JP)

(72) Inventor: Katsuhiko Okamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 30 days.

(21) Appl. No.: 17/196,302

(22) Filed: Mar. 9, 2021

(65) Prior Publication Data
US 2021/0286318 A1     Sep. 16, 2021

(30) Foreign Application Priority Data

Mar. 12, 2020 (JP) .............................. JP2020-043450

(51) Int. Cl.
*G03G 21/20* (2006.01)
*H04N 1/00* (2006.01)

(52) U.S. Cl.
CPC ....... *G03G 21/206* (2013.01); *H04N 1/00076* (2013.01); *H04N 1/00084* (2013.01); *H04N 1/00408* (2013.01); *H04N 1/00588* (2013.01); *H04N 1/00599* (2013.01); *H04N 1/00909* (2013.01); *H04N 2201/0082* (2013.01)

(58) Field of Classification Search
CPC ............. G03G 21/206; H04N 1/00076; H04N 1/00084; H04N 1/00408; H04N 1/00588; H04N 1/00599; H04N 1/00909; H04N 2201/0082

See application file for complete search history.

(56) References Cited

U.S. PATENT DOCUMENTS

| | | | | |
|---|---|---|---|---|
| 2003/0219274 A1* | 11/2003 | Hirose | ................. | G03G 21/206 |
| | | | | 399/92 |
| 2004/0197108 A1* | 10/2004 | Yamagata | .......... | H04N 1/32609 |
| | | | | 399/92 |
| 2018/0129162 A1* | 5/2018 | Takahashi | .......... | G03G 15/2039 |
| 2018/0231927 A1* | 8/2018 | Kunihisa | ............ | H05K 7/20727 |

FOREIGN PATENT DOCUMENTS

JP          2019-120713 A     7/2019

* cited by examiner

*Primary Examiner* — Moustapha Diaby
(74) *Attorney, Agent, or Firm* — IP Business Solutions, LLC

(57) ABSTRACT

An image forming apparatus prints an image on a sheet. The image forming apparatus includes a casing, a plurality of open/close devices, a plurality of fans, and a control device. The casing includes a plurality of openings and a plurality of ventilation holes. The plurality of open/close devices are attached to the casing, and configured to open and close the respectively corresponding openings. The plurality of fans each generate an airflow from inside of the casing to a corresponding one of the plurality of ventilation holes. The control device controls operation of the plurality of fans. The control device also detects occurrence of an event that restricts execution of the printing, identifies a type of the event, selects at least one of the plurality of fans according to the type of the event, and drives the selected fan.

6 Claims, 14 Drawing Sheets

IMAGE FORMING APPARATUS

INCORPORATION BY REFERENCE

This application claims priority to Japanese Patent Application No. 2020-43450 filed on Mar. 12, 2020, the entire contents of which are incorporated by reference herein.

BACKGROUND

The present disclosure relates to an image forming apparatus.

Existing image forming apparatuses include, for example, the one having a main body and a front cover. The main body includes a first opening and a second opening. The first opening is used to mount and remove a toner cartridge. The second opening is for discharging a part of a recording sheet to outside of the main body, to turn over the recording sheet. The front cover is configured to open and close both of the first opening and the second opening, at a time. The image forming apparatus is configured to restrict odor originating from the recording sheet that has undergone a fixing process, from being emitted to outside from the front side of the main body.

SUMMARY

The disclosure proposes further improvement of the foregoing technique.

In an aspect, the disclosure provides an image forming apparatus that executes an image printing operation on a sheet. The image forming apparatus includes a casing, a plurality of open/close devices, a plurality of fans, and a control device. The casing includes a plurality of openings and a plurality of ventilation holes. The plurality of open/close devices are attached to the casing, and configured to open and close the respectively corresponding openings. The plurality of fans each generate an airflow from inside of the casing to a corresponding one of the plurality of ventilation holes. The control device controls operation of the plurality of fans. The control device also detects occurrence of an event that restricts execution of the printing, identifies a type of the event, selects at least one of the plurality of fans according to the type of the event, and drives the selected fan.

DETAILED DESCRIPTION

Figure 1:
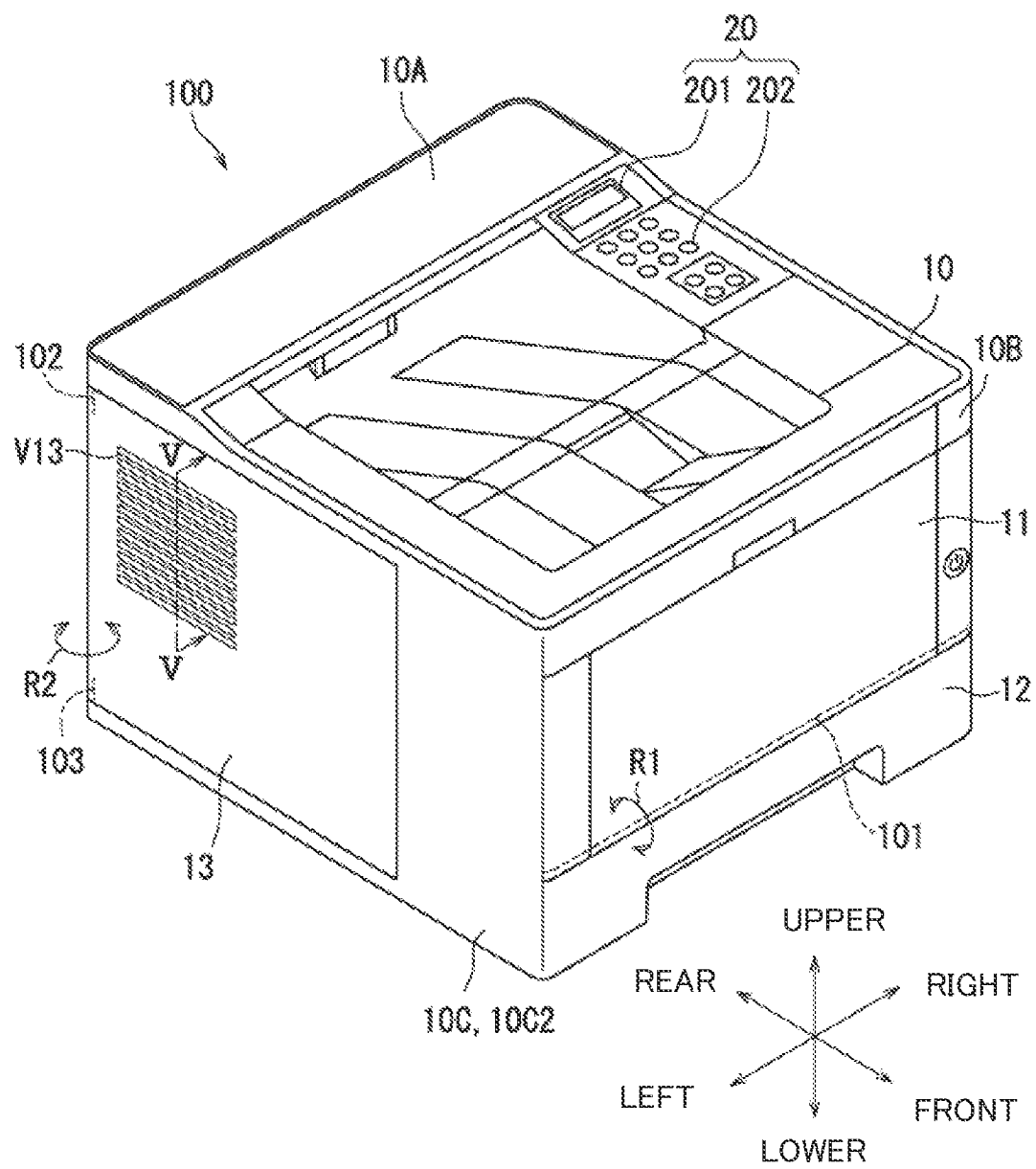
FIG. 1 is a perspective view showing an image forming apparatus according to a first embodiment of the disclosure.

Hereafter, an image forming apparatus according to an embodiment representing an aspect of the disclosure will be described, with reference to the drawings. In the drawings, the same or corresponding elements are given the same numeral, and the description thereof will not be repeated.

First Embodiment

Figure 2:
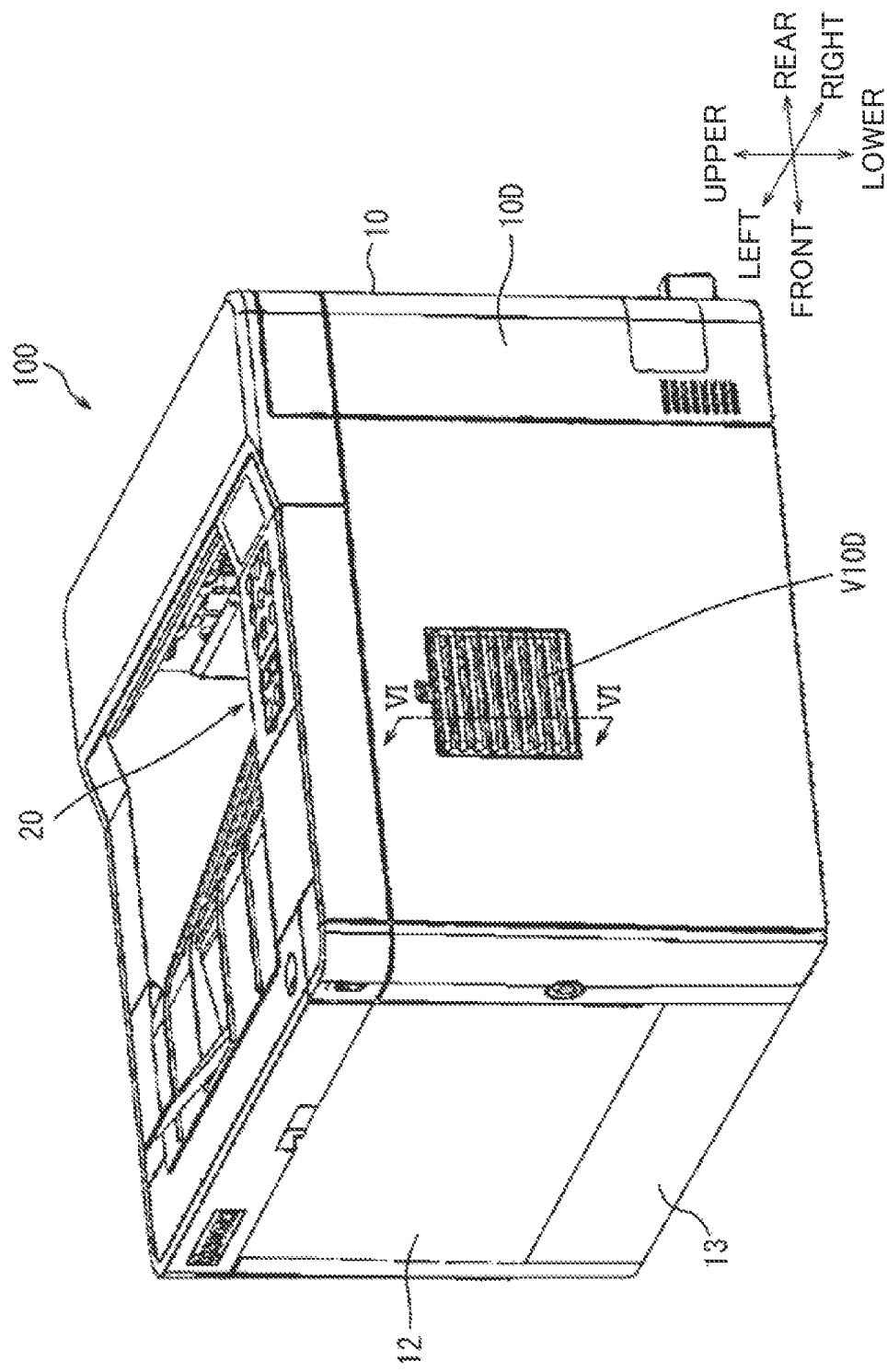
FIG. 2 is another perspective view showing the image forming apparatus according to the first embodiment of the disclosure.

Referring to FIG. 1 and FIG. 2, the image forming apparatus 100 according to a first embodiment will be described. FIG. 1 and FIG. 2 are perspective views showing a configuration of the image forming apparatus 100 according to the first embodiment.

The image forming apparatus 100 executes printing operation, to thereby print an image on a sheet P. As shown in FIG. 1, the image forming apparatus 100 is, for example, a printer based on electrophotography. The image forming apparatus 100 includes a casing 10, a front cover 11, a cassette 12, a left cover 13, and an operation panel 20. The sheet P may be, for example, a plain paper, a copying paper, a recycled paper, a thin paper, a cardboard, a glossy paper, or an overhead projector (OHP) sheet. The front cover 11 exemplifies the plurality of open/close devices and the first cover in the disclosure. The cassette 12 exemplifies the plurality of open/close devices in the disclosure. The left cover 13 exemplifies the plurality of open/close devices and the second cover in the disclosure.

For the purpose of the description of the first embodiment, the side of the image forming apparatus 100 on which the front cover 11 is located will be defined as the front side of the image forming apparatus 100, and the opposite side will be defined as the rear side of the image forming apparatus 100. In addition, the right-hand side of the image forming apparatus 100 viewed from the front side will be defined as the right side of the image forming apparatus 100, and the opposite side will be defined as the left side of the image forming apparatus 100. Further, along a direction orthogonal to the front-rear direction and the left-right direction of the image forming apparatus 100, the side on which the operation panel 20 is located will be defined as the upper side of the image forming apparatus 100, and the opposite side will be defined as the lower side of the image forming apparatus 100.

The casing 10 is formed as a box of a generally rectangular parallelepiped shape. The casing 10 includes an upper wall 10A, a front wall 10B, and a left wall 10C. The upper wall 10A of the casing 10 and the operation panel 20 constitute the top face of the image forming apparatus 100. The front wall 10B of the casing 10, the front cover 11, and the cassette 12 constitute the front face of the image forming apparatus 100. The left wall 10C of the casing and the left cover 13 constitute the left face of the image forming apparatus 100. The front wall 10B exemplifies the first wall in the disclosure, and the left wall 10C exemplifies the third wall in the disclosure.

The operation panel 20 includes a touch display 201 and operation buttons 202. The touch display 201 includes, for example, a liquid crystal display (LCD), to display information. The touch display 201 includes a touch sensor, through which an operation of a user is received. The operation buttons 202 include a start button, arrow keys, and a tenkey. The touch display 201 exemplifies the display device in the disclosure.

The front cover 11 is connected to the casing 10 via a hinge joint. The casing 10 includes a hinge shaft 101. The front cover 11 is configured to pivot about the central axis of the hinge shaft 101 in a circumferential direction R1, with respect to the casing 10.

The cassette 12 accommodates therein a plurality of sheets P. The cassette 12 is mounted inside the casing 10, so as to open and close the casing 10. The cassette 12 can be drawn out and inserted in the front-rear direction, with respect to the casing 10.

The left cover 13 is connected to the casing 10 via a hinge joint. The casing 10 includes an upper hinge shaft 102 and a lower hinge shaft 103. The left cover 13 is configured to pivot about a pivotal axis drawn between the upper hinge shaft 102 and the lower hinge shaft 103, in a circumferential direction R2, with respect to the casing 10. The left cover 13 includes a left cover ventilation hole V13.

As shown in FIG. 2, the casing 10 includes a right wall 10D. The right wall 10D is located opposite to the left wall 10C (see FIG. 1). The right wall 10D of the casing 10 constitutes the right face of the image forming apparatus 100. The casing 10 includes a right ventilation hole V10D formed in the right wall 10D. The right ventilation hole V10D communicates between the inside and outside of the casing 10. The right wall 10D exemplifies the fourth wall in the disclosure. The right ventilation hole V10D exemplifies the plurality of ventilation holes and the second ventilation hole in the disclosure.

Figure 3:
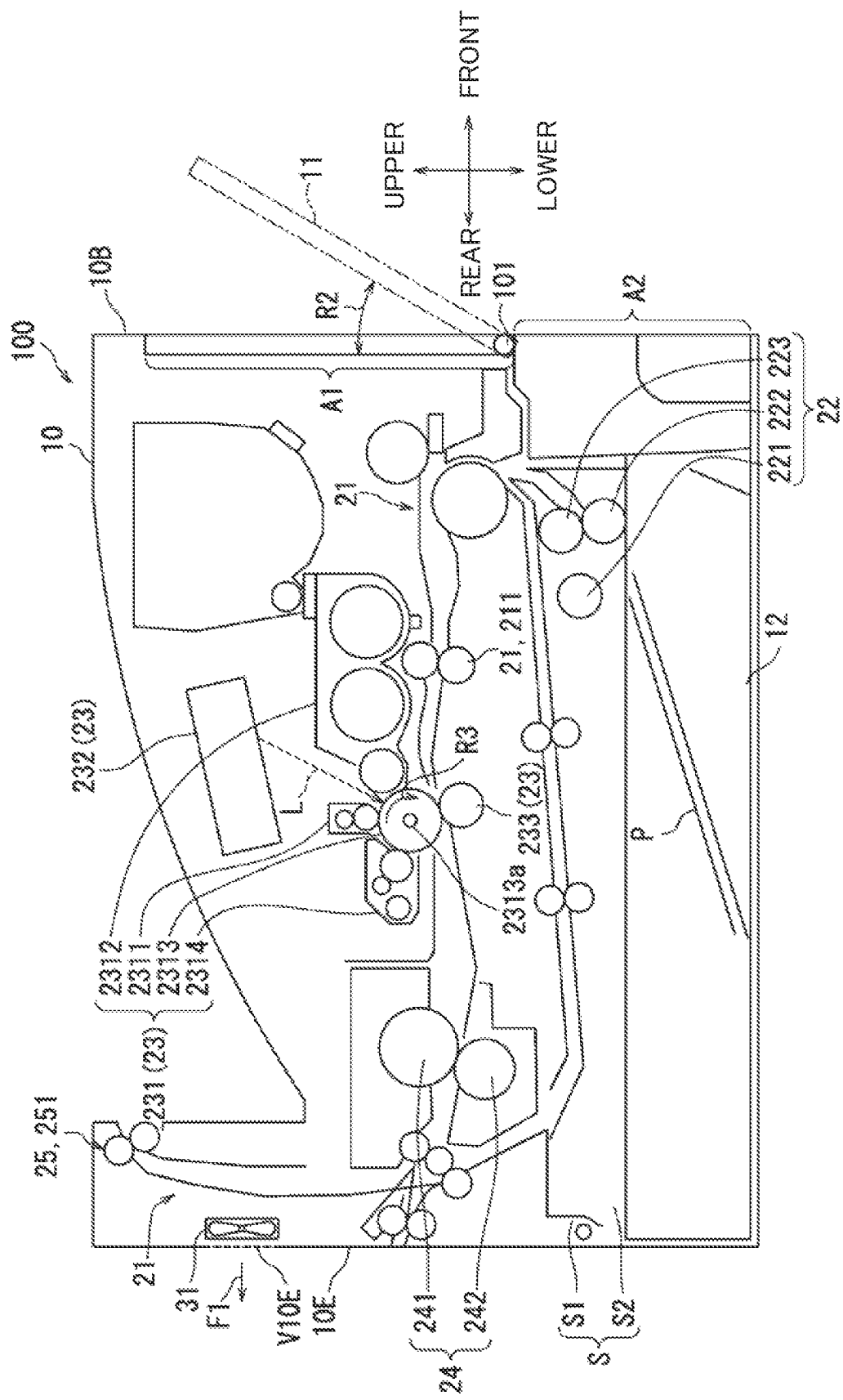
FIG. 3 is a schematic cross-sectional view of the image forming apparatus according to the first embodiment of the disclosure.

Referring now to FIG. 3, the configuration of the image forming apparatus 100 will be described in detail. FIG. 3 illustrates the structure of the image forming apparatus 100 according to the first embodiment.

As shown in FIG. 3, the image forming apparatus 100 includes a transport device 21, a feeding device 22, an image forming device 23, a fixing device 24, and a discharge device 25. The casing 10 defines an inner space S. The inner space S includes an upper space S1 and a lower space S2. In the upper space S1, the transport device 21, the feeding device 22, the image forming device 23, the fixing device 24, and the discharge device 25 are accommodated. In the lower space S2, the cassette 12 is accommodated.

The transport device 21 includes a transport route. The transport route extends from the feeding device 22 to the discharge device 25. The transport device 21 transports the sheet P along the transport route. The transport device 21 includes a plurality of transport rollers 211.

The feeding device 22 delivers the sheets P stored in the cassette 12 to the transport device 21, one by one. The feeding device 22 includes a pickup roller 221, a feed roller 222, and a retard roller 223.

The image forming device 23 forms an image on the sheet P, with toner. The image forming device 23 includes a replaceable unit 231, an optical scanner 232, and a transfer roller 233. The replaceable unit 231 is mounted in the casing 10, in an exchangeable manner.

The replaceable unit 231 includes a charging device 2311, a developing device 2312, a photoconductor drum 2313, and a cleaning device 2314. The photoconductor drum 2313 exemplifies the image carrier in the disclosure.

The photoconductor drum 2313 carries an electrostatic latent image, and a toner image. In the first embodiment, the photoconductor drum 2313 includes a rotary shaft 2313a extending in the left-right direction of the image forming apparatus 100. The photoconductor drum 2313 rotates about the rotary shaft 2313a, in a circumferential direction R3. The photoconductor drum 2313 is, for example, an organic photoconductor (OPC) drum.

The charging device 2311, the developing device 2312, the transfer roller 233, and the cleaning device 2314 are located in this order around the photoconductor drum 2313, along the circumferential direction R3.

The charging device 2311 charges the photoconductor drum 2313 to a predetermined potential, by electric discharge. The charging device 2311 is located on the upper side of the photoconductor drum 2313.

The optical scanner 232 emits a light beam L onto the photoconductor drum 2313 on the basis of image data, to thereby form an electrostatic latent image representing the image data, on the circumferential surface of the photoconductor drum 2313.

The developing device 2312 supplies the toner to the photoconductor drum 2313, to develop the electrostatic latent image on the photoconductor drum 2313 into a toner image.

The transfer roller 233 is located so as to oppose the photoconductor drum 2313, to transfer the toner image formed on the photoconductor drum 2313, to the sheet P. The sheet P to which the toner image has been transferred is transported to the fixing device 24.

The cleaning device 2314 removes the toner remaining on the photoconductor drum 2313.

The fixing device 24 fixes the image onto the sheet P. The image is thus printed on the sheet P. The fixing device 24 includes a heat roller 241 and a pressure roller 242.

The discharge device 25 discharges the sheet P to outside of the casing 10. The discharge device 25 includes a discharge roller pair 251.

The casing 10 includes an upper front opening A1 formed in the front wall 10B. The upper front opening A1 communicates with the upper space S1. The upper front opening A1 is a through hole for the user to make access to the replaceable unit 231, from outside of the casing 10. The user can replace the replaceable unit 231, through the upper front opening A1. The upper front opening A1 is located in a generally central region of the front wall 10B of the casing 10, in the up-down direction. The front cover 11 (see FIG. 1) is attached to the casing 10, so as to open and close the upper front opening A1. To be more detailed, when the front cover 11 is open, the front cover 11 opens up the upper front opening A1 of the casing 10. When the front cover 11 is closed, the front cover 11 covers the upper front opening A1 of the casing 10. The upper front opening A1 exemplifies the plurality of openings and the first opening in the disclosure.

The casing 10 includes a lower front opening A2 formed in the front wall 10B. The lower front opening A2 communicates with the lower space S2. The lower front opening A2 is a through hole for drawing out the cassette 12 from the lower space S2. The lower front opening A2 is located on the lower side of the upper front opening A1 of the front wall 10B, in the up-down direction. The cassette 12 is located at the position that allows the cassette 12 to be drawn out through the lower front opening A2. To be more detailed, when the cassette 12 is drawn out from the casing 10, the cassette 12 opens up the lower front opening A2 of the casing 10. When the cassette 12 is inserted in the casing 10, in other words when the cassette 12 is accommodated in the lower space S2, the cassette 12 covers the lower front opening A2 of the casing 10. When the cassette 12 is drawn out forward from the casing 10, and when the cassette 12 is inserted backward into the casing 10, the cassette 12 passes through the lower front opening A2. Thus, the cassette 12 is mounted in the casing 10, so as to open and close the lower front opening A2. The lower front opening A2 exemplifies the plurality of openings and the second opening in the disclosure.

The casing 10 includes a rear wall 10E. The rear wall 10E of the casing 10 constitutes the rear face of the image forming apparatus 100. The rear wall 10E is located opposite to the front wall 10B. The casing 10 includes a rear ventilation hole V10E formed in the rear wall 10E. The rear ventilation hole V10E communicates with the upper front opening A1 and the lower front opening A2, via the inner space S. The rear wall 10E exemplifies the second wall in the disclosure. The rear ventilation hole V10E exemplifies the plurality of ventilation holes and the first ventilation hole in the disclosure.

The image forming apparatus 100 also includes a rear exhaust fan 31. The rear exhaust fan 31 is located inside the casing 10, at a position close to the rear ventilation hole V10E. The rear exhaust fan 31 generates an exhaust airflow F1, upon being driven. The exhaust airflow F1 represents the flow of air from inside of the casing 10 to outside thereof, through the rear ventilation hole V10E. The exhaust airflow F1 primarily serves to discharge the odor emitted from the sheet P that has undergone the fixing process, to outside of the casing 10 through the rear ventilation hole V10E. The odor emitted from the sheet P that has undergone the fixing process contains a volatile organic compound. In the first embodiment, when the rear exhaust fan 31 is driven, the air around the upper front opening A1 and the lower front opening A2 is discharged to outside of the casing 10, through the rear ventilation hole V10E. Accordingly, the exhaust airflow F1 serves to discharge the odor emitted from the image forming device 23 and the fixing device 24, to outside of the casing 10 through the rear ventilation hole V10E. The odor emitted from the image forming device 23 and the fixing device 24 contains a volatile organic compound. The rear exhaust fan 31 exemplifies the plurality of fans and the first fan in the disclosure.

Figure 4:
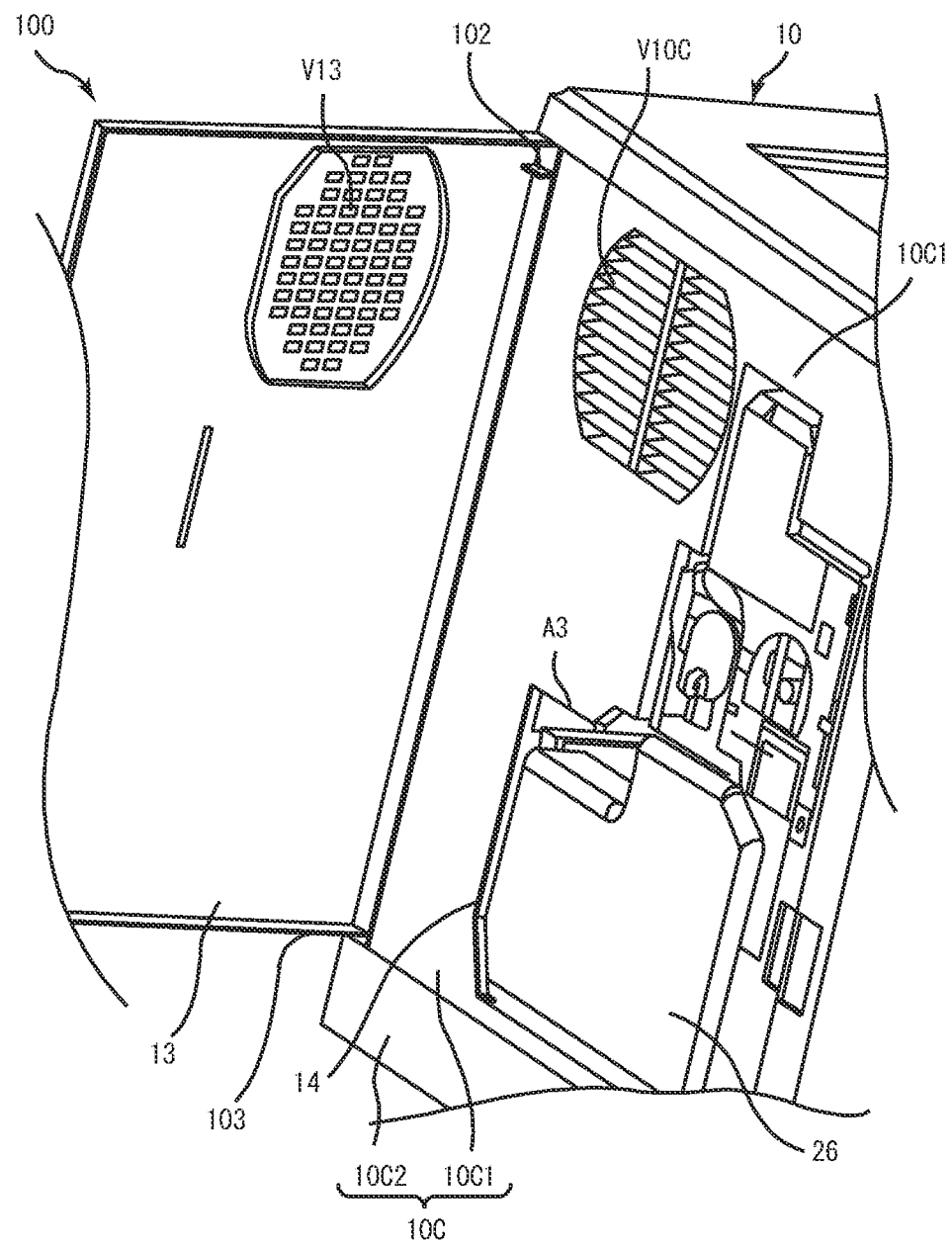
FIG. 4 is a partial perspective view of the image forming apparatus according to the first embodiment of the disclosure.

Hereunder, the configuration of the image forming apparatus 100 will be described in further detail, with reference to FIG. 1 to FIG. 6. FIG. 4 illustrates a part of the structure of the image forming apparatus 100 according to the first embodiment. More specifically, FIG. 4 illustrates the appearance of the image forming apparatus 100 with the left cover 13 opened.

As shown in FIG. 4, the left wall 10C of the casing 10 includes a recessed region 10C1 and a flat region 10C2. The recessed region 10C1 is recessed with respect to the flat region 10C2. When the left cover 13 is closed as shown in FIG. 1, the left cover 13 is fitted in the recessed region 10C1.

As shown in FIG. 4, the image forming apparatus 100 also includes a waste toner container 26. In the waste toner container 26, waste toner is accumulated. The waste toner refers to the toner removed by the cleaning device 2314 from the photoconductor drum 2313. The casing 10 includes a waste toner container compartment 14. In the waste toner container compartment 14, the waste toner container 26 is mounted. The waste toner container compartment 14 includes a mounting space and a toner outlet. The mounting space refers to the space in which the waste toner container 26 is mounted. The toner outlet refers to the outlet through which the toner collected by the cleaning device 2314 is discharged. Upon being mounted in the mounting space, the waste toner container 26 is connected to the toner outlet.

The casing 10 includes a left opening A3 formed in the recessed region 10C1 of the left wall 10C. The left opening A3 communicates with the mounting space of the waste toner container compartment 14. The left cover 13 is attached to the casing 10, so as to open and close the left opening A3. The user can replace the waste toner container 26, by opening the left cover 13. The left opening A3 exemplifies the plurality of openings and the third opening in the disclosure.

The casing 10 includes a left ventilation hole V10C, formed in the recessed region 10C1 of the left wall 10C. The left ventilation hole V10C communicates between the inside and outside of the casing 10. The left ventilation hole V10C is located so as to correspond to the left cover ventilation hole V13 of the left cover 13. In other words, the left ventilation hole V10C of the left wall 10C is formed so as to overlap with the left cover ventilation hole V13, when the left cover 13 is closed. The left ventilation hole V10C exemplifies the plurality of ventilation holes and the second ventilation hole in the disclosure.

Figure 5:
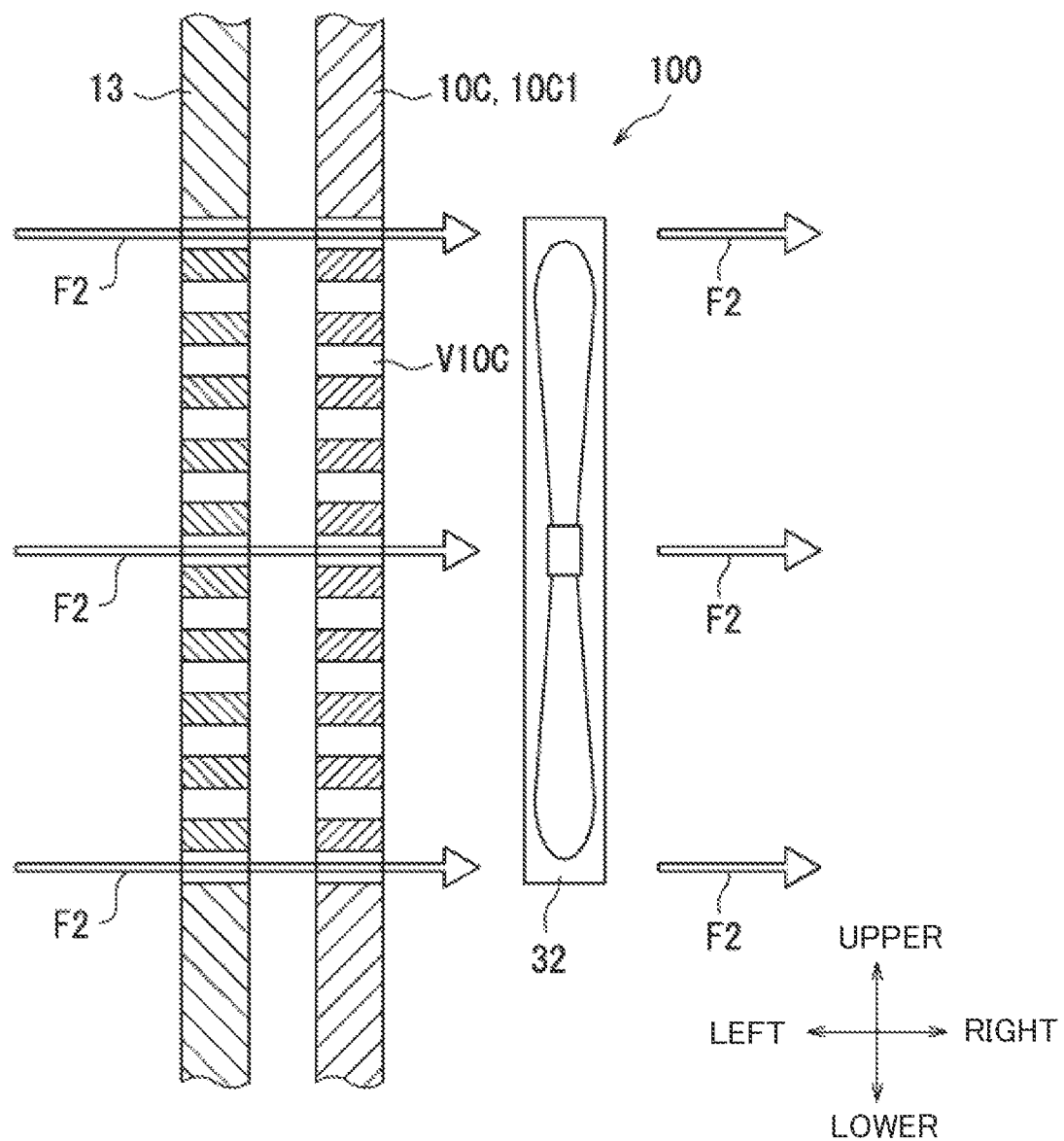
FIG. 5 is a partial cross-sectional view of the image forming apparatus, taken along a line V in FIG. 1.

FIG. 5 is a partial cross-sectional view of the image forming apparatus 100, taken along a line V in FIG. 1. As shown in FIG. 5, the image forming apparatus 100 includes a left suction fan 32. The left suction fan 32 is located inside the casing 10, at a position close to the left ventilation hole V10C. To be more detailed, the left cover 13, the left wall 10C, and the left suction fan 32 are provided such that, when the left cover 13 is closed, the left cover ventilation hole V13, the left ventilation hole V10C, and the left suction fan 32 are sequentially aligned from the outer side of the casing 10. The left suction fan 32 generates a suction airflow F2, upon being driven. The suction airflow F2 represents the flow of air from outside of the casing 10 to inside thereof. The suction airflow F2 primarily serves to introduce air into inside of the casing 10 through the left cover ventilation hole V13 and the left ventilation hole V10C, thereby cooling the developing device 2312 (see FIG. 3) and other components. The left suction fan 32 exemplifies the third fan in the disclosure.

Figure 6:
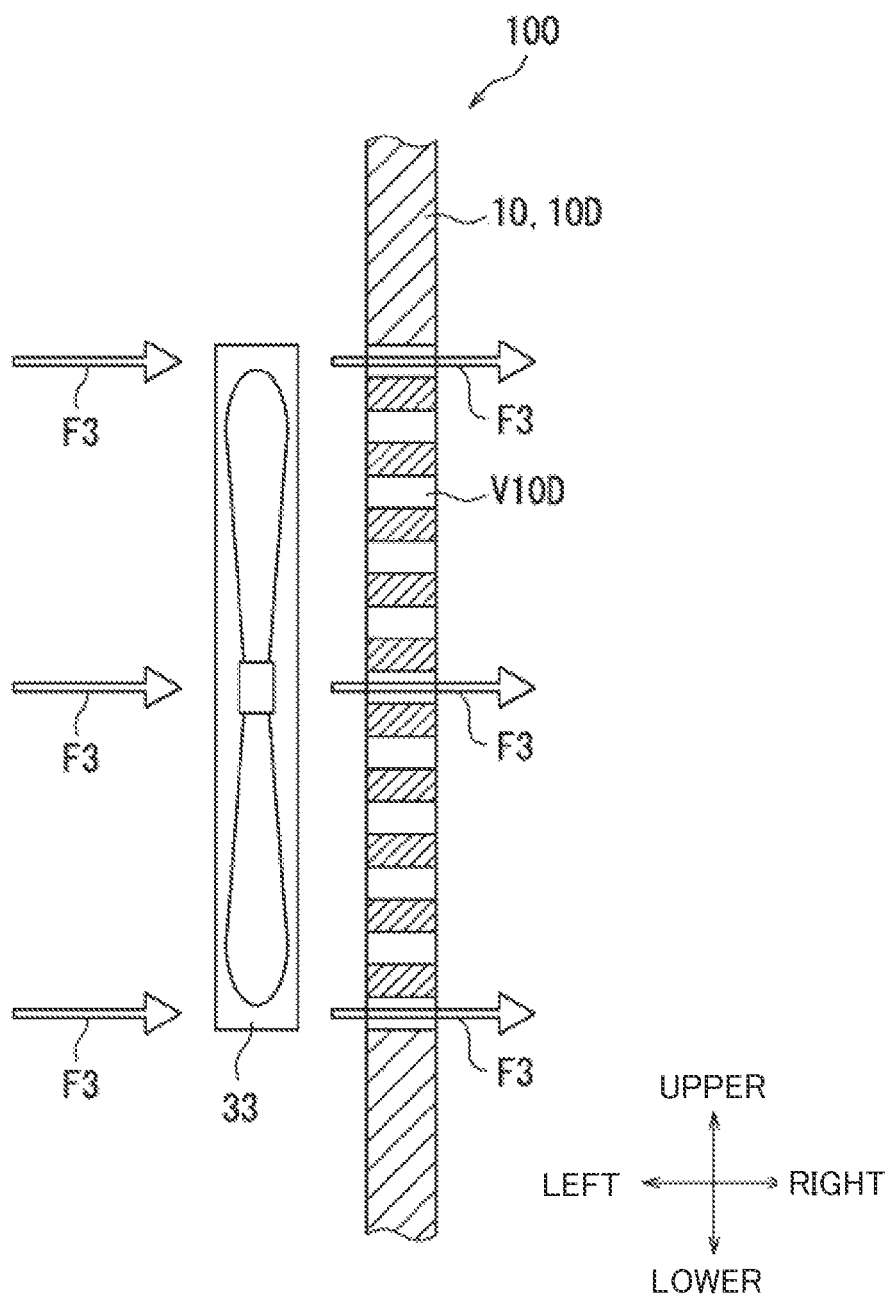
FIG. 6 is a partial cross-sectional view of the image forming apparatus, taken along a line VI in FIG. 2.

FIG. 6 is a partial cross-sectional view of the image forming apparatus 100, taken along a line VI in FIG. 2. As shown in FIG. 6, the image forming apparatus 100 includes a right exhaust fan 33. The right exhaust fan 33 is located inside the casing 10, at a position close to the right ventilation hole V10D. The right ventilation hole V10D communicates with the left opening A3 of the left wall 10C (see FIG. 4), via the inner space S (see FIG. 3). The right exhaust fan 33 generates an exhaust airflow F3, upon being driven. The exhaust airflow F3 represents the flow of air from inside of the casing 10 to outside thereof. The exhaust airflow F3 primarily serves to discharge the odor emitted from the image forming device 23 to outside of the casing 10, through the right ventilation hole V10D. The right exhaust fan 33 exemplifies the plurality of fans and the second fan in the disclosure.

Figure 7:
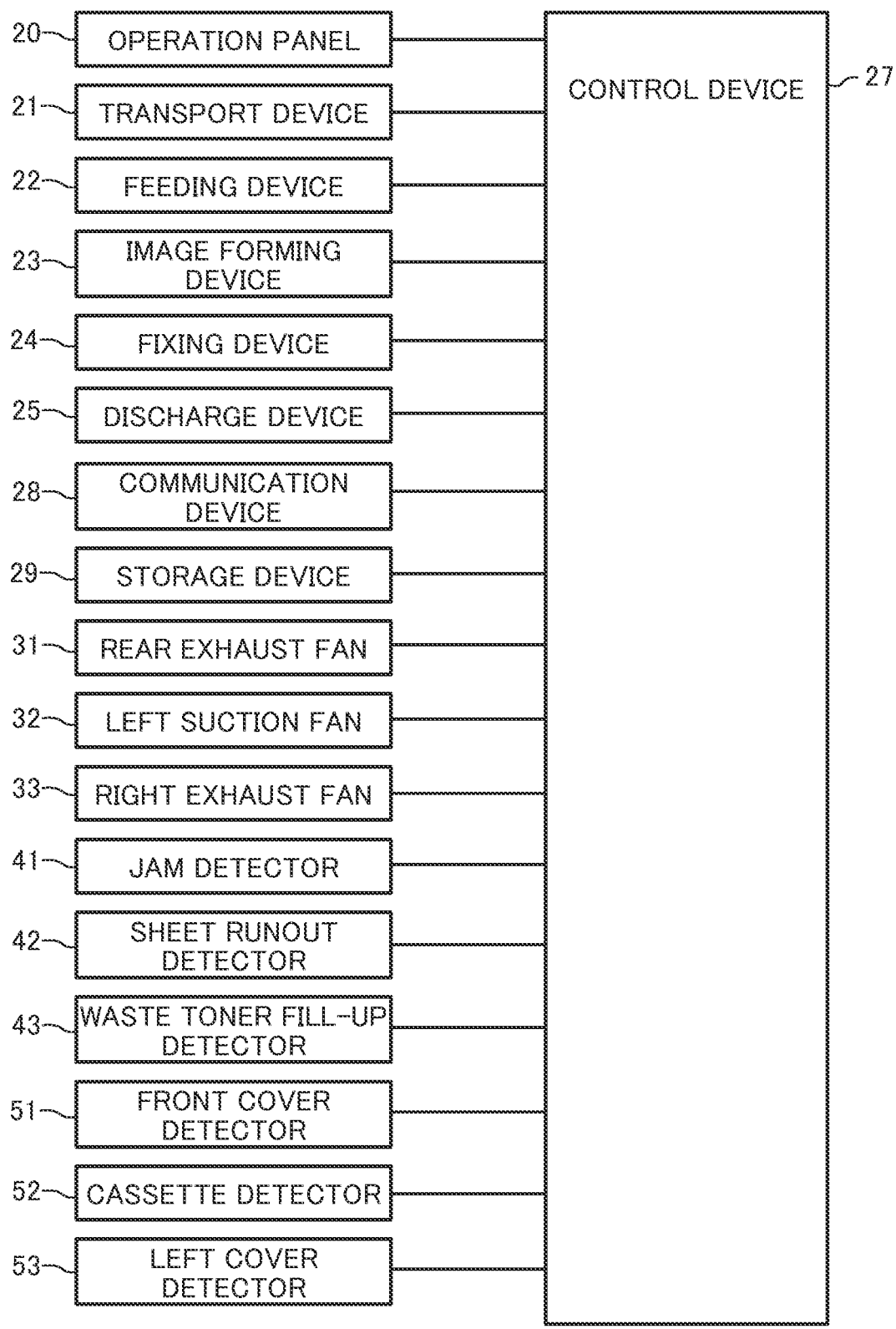
FIG. 7 is a block diagram showing a configuration of the image forming apparatus according to the first embodiment of the disclosure.

Hereunder, further details of the configuration of the image forming apparatus 100 will be described, with reference to FIG. 1 to FIG. 7. FIG. 7 is a block diagram showing the configuration of the image forming apparatus 100 according to the first embodiment.

As shown in FIG. 7, the image forming apparatus 100 further includes a control device 27, a communication device 28, a storage device 29, a jam detector 41, a sheet runout detector 42, a waste toner fill-up detector 43, a front cover detector 51, a cassette detector 52, and a left cover detector 53. The front cover detector 51, the cassette detector 52, and the left cover detector 53 exemplify the open/close detector in the disclosure.

The jam detector 41 detects occurrence of a jam of the sheet P on the transport route. Hereinafter, the occurrence of the jam of the sheet P on the transport route will be simply referred to as "sheet jam". The jam detector 41 includes, for example, a plurality of sheet sensors provided along the transport route of the transport device 21. The sheet sensor may be, for example, a transmissive optical sensor or a reflective optical sensor. The control device 27 detects whether a jam has occurred, according to the signal transmitted from the sheet sensor.

In the first embodiment, when the jam has occurred, the user can open the front cover 11, remove the jammed sheet from the transport route through the upper front opening A1, and close the front cover 11, thus fixing the jam. Otherwise, the user can also draw out the cassette 12 from the casing 10, remove the jammed sheet from the transport route through the lower front opening A2, and insert the cassette 12 into the casing 10, thus fixing the jam.

The sheet runout detector 42 detects that no sheet P is present in the cassette 12. Hereinafter, the state where no sheet P is present in the cassette 12 will be referred to as "sheet runout". The sheet runout detector 42 is provided in association with the cassette 12. The sheet runout detector 42 may be, for example, a reflective optical sensor. The control device 27 detects whether the sheet has run out, according to the signal transmitted from the sheet runout detector 42.

In the first embodiment, when the sheet has run out, the user can draw out the cassette 12 from the casing 10, replenish the cassette 12 with sheets P, and insert the cassette 12 into the casing 10, thus resolving the sheet runout.

The waste toner fill-up detector 43 detects that the waste toner container 26 has been filled up with the waste toner. Hereinafter, the state where the waste toner container 26 has been filled up with the waste toner will be referred to as "waste toner fill-up". The waste toner fill-up detector 43 is provided in association with the waste toner container 26. The waste toner fill-up detector 43 may be, for example, a transmissive optical sensor. The control device 27 detects whether the waste toner container 26 is full, according to the signal transmitted from the waste toner fill-up detector 43.

In the first embodiment, when the waste toner fill-up takes place, the user can open the left cover 13, replace the waste toner container 26 filled up with the waste toner with another waste toner container 26 not filled with waste toner, through the left opening A3, and close the left cover 13, thus resolving the waste toner fill-up situation.

The front cover detector 51 detects the open/close status of the front cover 11. In other words, the front cover detector 51 detects whether the front cover 11 is covering the upper front opening A1 of the casing 10. The front cover detector 51 includes a sensor that turns on and off according to the opening and closing of the front cover 11. The front cover detector 51 may be, for example, a mechanical, an optical, or a magnetic sensor.

The cassette detector 52 detects the open/close status of the cassette 12. In other words, the cassette detector 52 detects whether the cassette 12 is covering the lower front opening A2 of the casing 10. The cassette detector 52 includes a sensor that turns on and off according to the removal and mounting of the cassette 12. The cassette detector 52 may be, for example, a mechanical, an optical, or a magnetic sensor.

The left cover detector 53 detects the open/close status of the left cover 13. In other words, the left cover detector 53 detects whether the left cover 13 is covering the recessed region 10C1 of the left wall 10C. The left cover detector 53 includes a sensor that turns on and off according to the opening and closing of the left cover 13. The left cover detector 53 may be, for example, a mechanical, an optical, or a magnetic sensor.

The communication device 28 makes communication with an external terminal device via a network. The communication device 28 receives image forming job data transmitted from the external terminal device. The image forming job data represents image data and setting information. The setting information includes quantity information, simplex/duplex information, BW/color information, and sheet information. The quantity information indicates the number of copies. The simplex/duplex information indicates whether the image is to be formed on one side of the sheet P, or on both sides thereof. The BW/color information indicates whether a monochrome image or a color image is to be formed. The sheet information indicates the type of the sheet P. The communication device 28 is a communication interface. The external terminal device is, for example, a desktop personal computer, a laptop personal computer, a tablet terminal, or a smartphone.

The storage device 29 includes a hard disk drive (HDD), a random-access memory (RAM), and a read-only memory (ROM). The storage device 29 contains a control program for controlling the operation of each component of the image forming apparatus 100. The image forming job data received by the communication device 28 is stored in the storage device 29.

The control device 27 is a hardware circuit. The hardware circuit includes a processor, such as a central processing unit (CPU). The control device 27 controls the operation panel 20, the transport device 21, the feeding device 22, the image forming device 23, the fixing device 24, the discharge device 25, the communication device 28, and the storage device 29, by executing the control program stored in the storage device 29.

In the first embodiment, the control device 27 performs a first exhausting operation. The first exhausting operation includes controlling the operation of the rear exhaust fan 31, the left suction fan 32, and the right exhaust fan 33, according to the type of a stoppage event that has occurred, and the open/close status of the plurality of open/close devices. The details of the first exhausting operation will be subsequently described, with reference to FIG. 8, FIG. 10, and FIG. 11.

The stoppage event refers to an event that restricts the execution of the printing operation. The stoppage event includes a first event, a second event, and a third event. The first event refers to an event that requires the front cover 11 to be opened. More specifically, the first event includes replacement of the replaceable unit 231, and the sheet jam. Hereinafter, the replacement of the replaceable unit 231 will be referred to as "unit replacement". The replaceable unit 231 is a consumable article. The need for the unit replacement arises when the replaceable unit 231 has worn out, and has to be replaced with an unworn replaceable unit 231, to allow the image forming apparatus 100 to execute the printing operation. The second event refers to an event that requires the cassette 12 to be drawn out from the casing 10. More specifically, the second event includes the occurrence of sheet runout. The third event includes the occurrence of waste toner fill-up.

The plurality of open/close devices include the front cover 11, the cassette 12, and the left cover 13.

In the first embodiment, the control device 27 controls the operation of the rear exhaust fan 31. In the first embodiment, the rear exhaust fan 31 is controlled by the control device 27, so as to rotate at a first full speed, or a first half speed. The rear exhaust fan 31 is also made to stop, under the control of the control device 27. The first full speed is faster than the first half speed. In the first embodiment, the first full speed corresponds to a maximum rotation speed of the rear exhaust fan 31. The first half speed refers to the rotation speed that is half the maximum rotation speed of the rear exhaust fan 31. The first half speed exemplifies the first rotation speed in the disclosure. The first full speed exemplifies the second rotation speed in the disclosure.

In the first embodiment, the control device 27 controls the operation of the right exhaust fan 33. In the first embodiment, the right exhaust fan 33 is controlled by the control device 27, so as to rotate at a second full speed, or a second half speed. The right exhaust fan 33 is also made to stop, under the control of the control device 27. The second full speed is faster than the second half speed. In the first embodiment, the second full speed corresponds to a maximum rotation speed of the right exhaust fan 33. The second half speed refers to the rotation speed that is half the maximum rotation speed of the right exhaust fan 33. The second half speed exemplifies the first rotation speed in the disclosure. The second full speed exemplifies the second rotation speed in the disclosure.

In the first embodiment, the control device 27 controls the operation of the left suction fan 32. In the first embodiment, the left suction fan 32 is controlled by the control device 27, so as to rotate at a third half speed. The left suction fan 32 is also made to stop, under the control of the control device 27. In the first embodiment, the third half speed refers to the rotation speed that is half the maximum rotation speed of the left suction fan 32.

Figure 8:
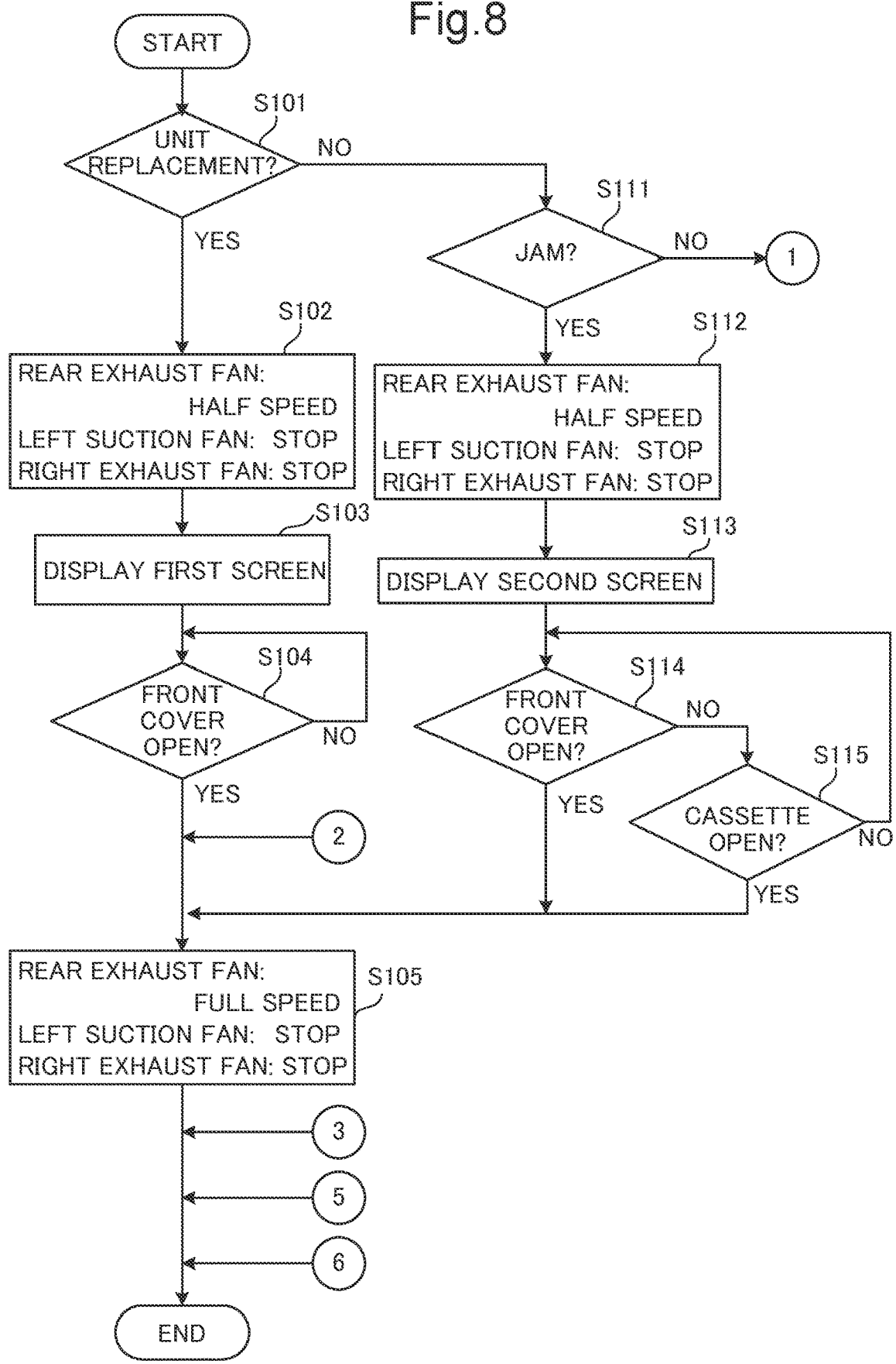
FIG. 8 is a flowchart showing a first exhausting operation performed by the image forming apparatus according to the first embodiment of the disclosure.
Figure 9:
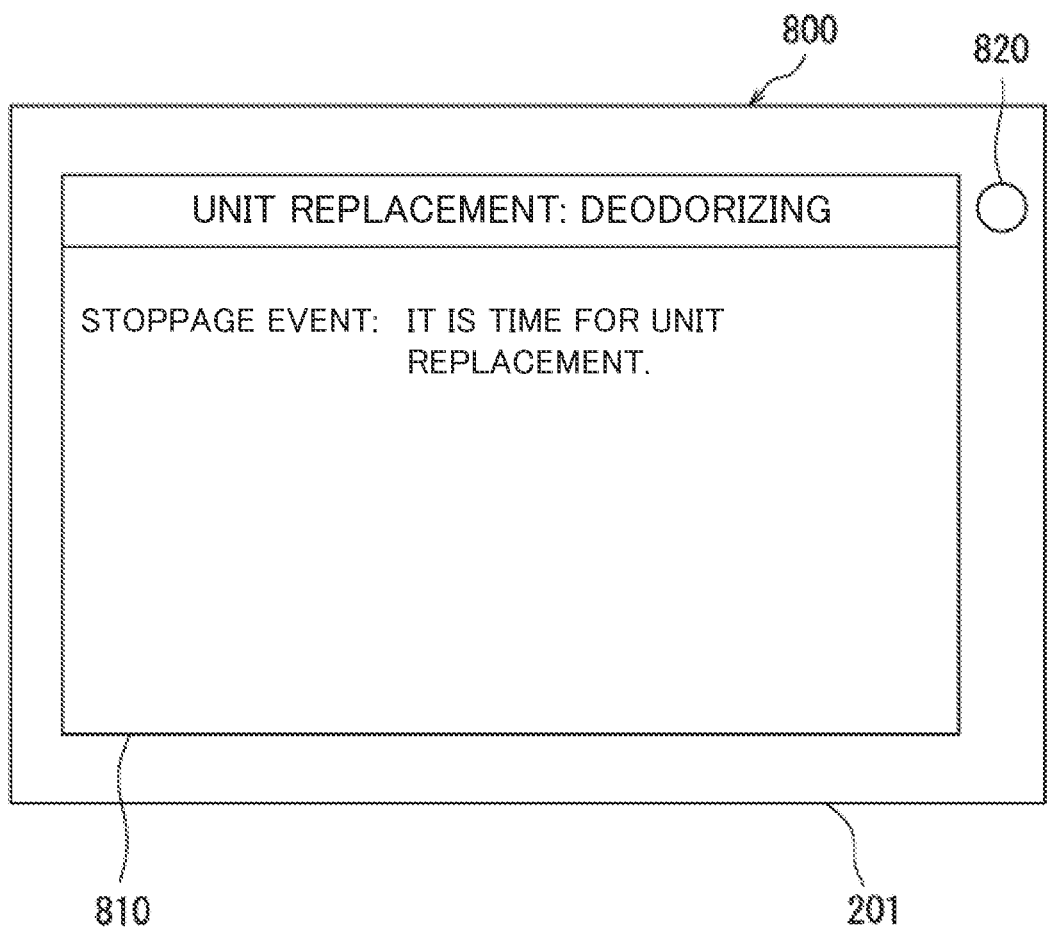
FIG. 9 is a schematic drawing showing a first screen according to the first embodiment of the disclosure.
Figure 10:
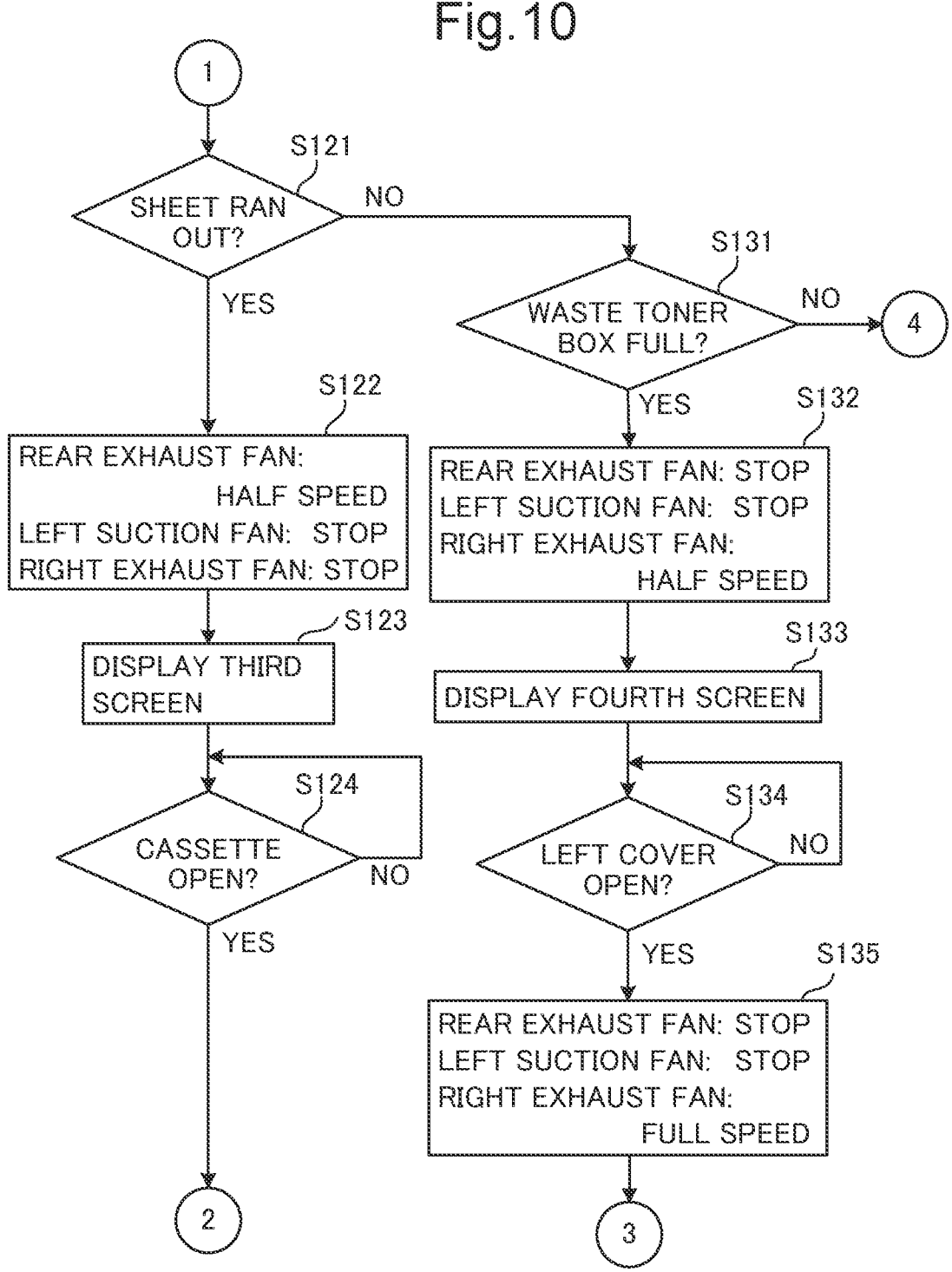
FIG. 10 is a flowchart branched from FIG. 8, showing the first exhausting operation performed by the image forming apparatus according to the first embodiment of the disclosure.
Figure 11:
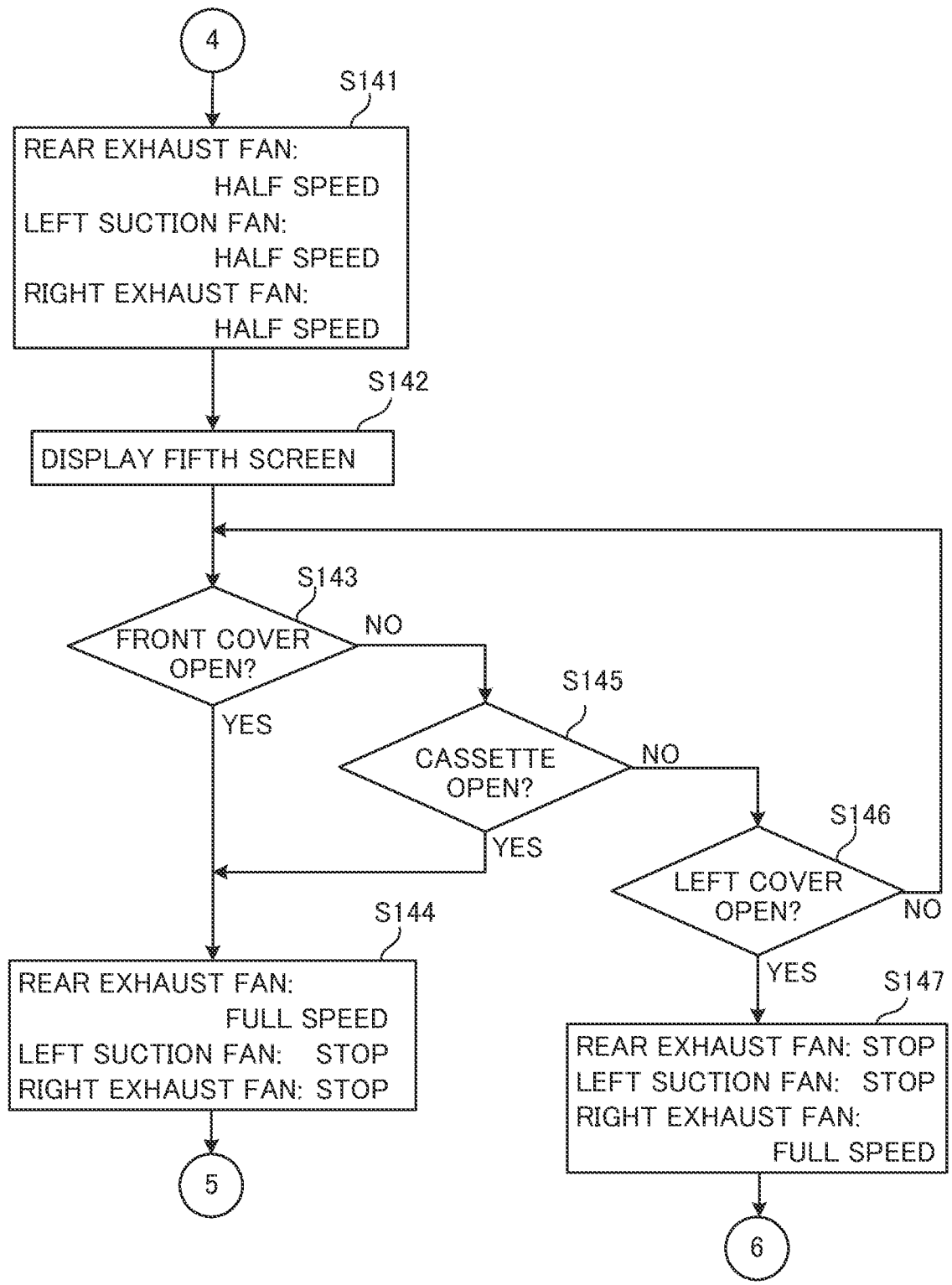
FIG. 11 is a flowchart branched from FIG. 10, showing the first exhausting operation performed by the image forming apparatus according to the first embodiment of the disclosure.

Referring now to FIG. 8 to FIG. 11, the first exhausting operation performed by the control device 27 will be described hereunder. FIG. 8, FIG. 10, and FIG. 11 are flowcharts for explaining the first exhausting operation, performed by the image forming apparatus 100 according to the first embodiment.

The first exhausting operation specified in FIG. 8, FIG. 10, and FIG. 11 is started, when a stoppage event has occurred while the image forming apparatus 100 is executing the printing operation. The control device 27 controls the left suction fan 32 so as to rotate at the third half speed, while the image forming apparatus 100 is executing the printing operation.

Step S101: As shown in FIG. 8, the control device 27 decides whether the stoppage event is the need for unit replacement. When the control device 27 decides that the stoppage event is the need for unit replacement (Yes at step S101), the operation proceeds to step S102. When the control device 27 decides that the stoppage event is not the need for unit replacement (No at step S101), the operation proceeds to step S111.

In the first embodiment, the control device 27 decides whether the stoppage event is the need for unit replacement, as described below. The control device 27 counts the cumulative number of sheets P that the image forming apparatus 100 has executed the printing operation, from the time that a new replaceable unit 231 is mounted inside the casing 10, and stores the cumulative number of sheets in the storage device 29. Then the control device 27 decides whether the cumulative number of sheets has reached a predetermined number of sheets. The predetermined number of sheets is stored in the storage device 29. Upon deciding that the cumulative number of sheets is equal to or more than the predetermined number of sheets, the control device 27 decides that the stoppage event is the need for unit replacement. Upon deciding that the cumulative number of sheets is less than the predetermined number of sheets, the control device 27 decides that the stoppage event is not the need for unit replacement.

Step S102: The control device 27 controls the rear exhaust fan 31 so as to rotate at the first half speed. The control device 27 controls the left suction fan 32 so as to stop rotating. The control device 27 controls the right exhaust fan 33 so as to remain stopped. Thus, the control device 27 selects the rear exhaust fan 31 and causes the rear exhaust fan 31 to rotate, when the stoppage event is decided to be the need for unit replacement. Then the operation proceeds to step S103.

Step S103: The control device 27 causes the touch display 201 to display a first screen 800. The first screen 800 refers to the screen displaying a message to the effect that the rear exhaust fan 31 is rotating. Then the operation proceeds to step S104.

Referring to FIG. 9, the first screen 800 will be described hereunder. FIG. 9 illustrates the first screen 800 according to the first embodiment. The first screen 800 includes a first message image 810 and a first light image 820. The first message image 810 represents a message to the effect that the stoppage event is the need for unit replacement. The first light image 820 blinks while the rear exhaust fan 31 is rotating. The user can recognize that the rear exhaust fan 31 is rotating, in view of the blinking of the first light image 820.

Step S104: The control device 27 decides whether the front cover 11 has been opened, according to the output from the front cover detector 51. When the control device 27 decides that the front cover 11 has been opened (Yes at step S104), in other words when the user has replaced the replaceable unit 231 that has worn out with an unworn replaceable unit 231, the operation proceeds to step S105. When the control device 27 decides that the front cover 11 has not been opened (No at step S104), in other words when the user has not replaced the replaceable unit 231, the operation returns to step S104.

In the first embodiment, when the stoppage event is the need for unit replacement, the user opens the front cover 11, replaces the replaceable unit 231 that has worn out with an unworn replaceable unit 231 through the upper front opening A1, and closes the front cover 11, thus completing the unit replacement.

Step S105: The control device 27 controls the rear exhaust fan 31 so as to rotate at the first full speed. The control device 27 controls the left suction fan 32 and the right exhaust fan 33, so as to remain stopped. Here, the operation is finished.

Step S111: The control device 27 decides whether the stoppage event is the sheet jam, according to the output from the jam detector 41. When the control device 27 decides that the stoppage event is the sheet jam (Yes at step S111), the operation proceeds to step S112. When the control device 27 decides that the stoppage event is not the sheet jam (No at step S111), the operation proceeds to step S121 shown in FIG. 10.

Step S112: The control device 27 controls the rear exhaust fan 31 so as to rotate at the first half speed. The control device 27 controls the left suction fan 32 so as to stop rotating. The control device 27 controls the right exhaust fan 33 so as to remain stopped. The control device 27 selects the rear exhaust fan 31 and drives the same, upon deciding that the stoppage event is the sheet jam. Then the operation proceeds to step S113.

Step S113: The control device 27 causes the touch display 201 to display a second screen. The second screen refers, like the first screen 800 shown in FIG. 9, to the screen displaying a message to the effect that the rear exhaust fan 31 is rotating. Then the operation proceeds to step S114.

Step S114: The control device 27 decides whether the front cover 11 has been opened, according to the output from the front cover detector 51. When the control device 27 decides that the front cover 11 has been opened (Yes at step S114), in other words when the user has fixed the jam through the upper front opening A1, the operation proceeds to step S105. When the control device 27 decides that the front cover 11 has not been opened (No at step S114), in other words when the user has not fixed the jam through the upper front opening A1, the operation proceeds to step S115.

Step S115: The control device 27 decides whether the cassette 12 has been drawn out from the casing 10, according to the output from the cassette detector 52. When the control device 27 decides that the cassette 12 has been drawn out from the casing 10 (Yes at step S115), in other words when the user has fixed the jam through the lower front opening A2, the operation proceeds to step S105. When the control device 27 decides that the cassette 12 has not been drawn out from the casing 10 (No at step S115), in other words when the user has not fixed the jam, the operation returns to step S114.

Step S121: As shown in FIG. 10, the control device 27 decides whether the stoppage event is the sheet runout, according to the output from the sheet runout detector 42. When the control device 27 decides that the stoppage event is the sheet runout (Yes at step S121), the operation proceeds to step S122. When the control device 27 decides that the stoppage event is not the sheet runout (No at step S121), the operation proceeds to step S131.

Step S122: The control device 27 controls the rear exhaust fan 31 so as to rotate at the first half speed. The control device 27 controls the left suction fan 32 so as to stop rotating. The control device 27 controls the right exhaust fan 33 so as to remain stopped. The control device 27 selects the rear exhaust fan 31 and drives the same, upon deciding that the stoppage event is the sheet runout. Then the operation proceeds to step S123.

Step S123: The control device 27 causes the touch display 201 to display a third screen. The third screen refers, like the first screen 800 shown in FIG. 9, to the screen displaying a message to the effect that the rear exhaust fan 31 is rotating. Then the operation proceeds to step S124.

Step S124: The control device 27 decides whether the cassette 12 has been drawn out from the casing 10, according to the output from the cassette detector 52. When the control device 27 decides that the cassette 12 has been drawn out from the casing 10 (Yes at step S124), in other words when the user has fixed the sheet runout, the operation proceeds to step S105 shown in FIG. 8. When the control device 27 decides that the cassette 12 has not been drawn out from the casing 10 (No at step S124), in other words when the user has not fixed the sheet runout, the operation returns to step S124.

Step S131: The control device 27 decides whether the stoppage event is the waste toner fill-up, according to the output from the waste toner fill-up detector 43. When the control device 27 decides that the stoppage event is the waste toner fill-up (Yes at step S131), the operation proceeds to step S132. When the control device 27 decides that the stoppage event is not the waste toner fill-up (No at step S131), in other words when the stoppage event is none of the need for unit replacement, the sheet jam, the sheet runout, and the waste toner fill-up, the operation proceeds to step S141 shown in FIG. 11.

Step S132: The control device 27 controls the rear exhaust fan 31 so as to remain stopped. The control device 27 controls the left suction fan 32 so as to stop rotating. The control device 27 controls the right exhaust fan 33 so as to rotate at the second half speed. Thus, the control device 27 selects the right exhaust fan 33 and drives the same, upon deciding that the stoppage event is the waste toner fill-up. Then the operation proceeds to step S133.

Step S133: The control device 27 causes the touch display 201 to display a fourth screen. The fourth screen refers, like the first screen 800 shown in FIG. 9, to the screen displaying a message to the effect that the right exhaust fan 33 is rotating. Then the operation proceeds to step S134.

Step S134: The control device 27 decides whether the left cover 13 has been opened, according to the output from the left cover detector 53. When the control device 27 decides that the left cover 13 has been opened (Yes at step S134), in other words when the user has fixed the waste toner fill-up, the operation proceeds to step S135. When the control device 27 decides that the left cover 13 has not been opened (No at step S134), in other words when the user has not fixed the waste toner fill-up, the operation returns to step S134.

Step S135: The control device 27 controls the right exhaust fan 33 so as to rotate at the second full speed. The control device 27 controls the rear exhaust fan 31 and the left suction fan 32, so as to remain stopped. Here, the operation is finished.

Step S141: As shown in FIG. 11, the control device 27 controls the rear exhaust fan 31 so as to rotate at the first half speed. The control device 27 controls the left suction fan 32 so as to keep rotating at the third half speed. The control device 27 controls the right exhaust fan 33 so as to rotate at the second half speed. Thus, the control device 27 drives the rear exhaust fan 31, the left suction fan 32, and the right exhaust fan 33, upon deciding that the stoppage event is none of the need for unit replacement, the sheet jam, the sheet runout, and the waste toner fill-up. Then the operation proceeds to step S142.

Step S142: The control device 27 causes the touch display 201 to display a fifth screen. The fifth screen refers, like the first screen 800 shown in FIG. 9, to the screen displaying a message to the effect that the rear exhaust fan 31, the left suction fan 32, and the right exhaust fan 33 are rotating. Then the operation proceeds to step S143.

Step S143: The control device 27 decides whether the front cover 11 has been opened, according to the output from the front cover detector 51. When the control device 27 decides that the front cover 11 has been opened (Yes at step S143), in other words when the user has fixed the stoppage event through the upper front opening A1, the operation proceeds to step S144. When the control device 27 decides that the front cover 11 has not been opened (No at step S143), in other words when the user has not fixed the stoppage event through the upper front opening A1, the operation proceeds to step S145.

Step S144: The control device 27 controls the rear exhaust fan 31 so as to rotate at the first full speed. The control device 27 controls the left suction fan 32 and the right exhaust fan 33, so as to stop rotating. Here, the operation is finished.

Step S145: The control device 27 decides whether the cassette 12 has been drawn out from the casing 10, according to the output from the cassette detector 52. When the control device 27 decides that the cassette 12 has been drawn out from the casing 10 (Yes at step S145), in other words when the user has fixed the stoppage event through the lower front opening A2, the operation proceeds to step S144. When the control device 27 decides that the cassette 12 has not been drawn out from the casing 10 (No at step S145), in other words when the user has not fixed the stoppage event through the lower front opening A2, the operation proceeds to step S146.

Step S146: The control device 27 decides whether the left cover 13 has been opened, according to the output from the left cover detector 53. When the control device 27 decides that the left cover 13 has been opened (Yes at step S146), in other words when the user has fixed the stoppage event through the left opening A3, the operation proceeds to step S147. When the control device 27 decides that the left cover 13 has not been opened (No at step S146), in other words when the user has not fixed the stoppage event, the operation returns to step S143.

Step S147: The control device 27 controls the rear exhaust fan 31 and the left suction fan 32, so as to stop rotating. The control device 27 controls the right exhaust fan 33 so as to rotate at the second full speed. Here, the operation is finished.

As described above with reference to FIG. 1 to FIG. 11, the image forming apparatus 100 prints an image on the sheet P, in the first embodiment. The image forming apparatus 100 includes the casing 10, the front cover 11, the cassette 12, the left cover 13, the rear exhaust fan 31, the right exhaust fan 33, and the control device 27. The casing 10 includes the upper front opening A1, the lower front opening A2, and the left opening A3. The front cover 11 is attached to the casing 10 so as to open and close the upper front opening A1. The cassette 12 is mounted in the casing 10, so as to open and close the lower front opening A2. The left cover 13 is attached to the casing 10 so as to open and close the left opening A3. The casing 10 includes the rear ventilation hole V10E and the right ventilation hole V10D. The control device 27 detects the occurrence of a stoppage event, and identifies the type of the stoppage event. The control device 27 selects one of the rear exhaust fan 31 and the right exhaust fan 33, according to the type of the stoppage event. Hereinafter, one of the rear exhaust fan 31 and the right exhaust fan 33 that has been selected will be referred to as "selected fan". The control device 27 drives the selected fan. The user is prone to inhale the odor generated inside the casing 10, and emitted through the upper front opening A1, the lower front opening A2, and the left opening A3. In the first embodiment, the odor inside of the casing 10 is discharged to outside of the casing 10, through one of the rear ventilation hole V10E and the right ventilation hole V10D. Accordingly, when the user of the image forming apparatus 100 opens one of the front cover 11, the cassette 12, and the left cover 13 to fix the stoppage event, the odor inside of the casing 10 is prevented from being discharged through the upper front opening A1, the lower front opening A2, and the left opening A3. Consequently, the image forming apparatus 100 prevents the user from inhaling the odor.

As described above with reference to FIG. 1 to FIG. 11, the casing 10 includes the front wall 10B and the rear wall 10E which are spaced from each other, in the first embodiment. The front wall 10B includes the upper front opening A1. The rear wall 10E is located opposite to the front wall 10B. The rear wall 10E includes the rear ventilation hole V10E. When the type of the stoppage event is the first event, the control device 27 drives the rear exhaust fan 31. Thus, upon detecting the occurrence of the first event, the image forming apparatus 100 discharges the odor inside of the casing 10 to outside thereof, through the rear ventilation hole V10E located opposite to the front cover 11. Therefore, the image forming apparatus 100 further assures that the user is prevented from inhaling the odor.

As described above with reference to FIG. 1 to FIG. 11, the image forming apparatus 100 includes the image forming device 23, in the first embodiment. The image forming device 23 includes the replaceable unit 231. When the first event is the need for unit replacement, the control device 27 drives the rear exhaust fan 31. In other words, when the stoppage event is the need for unit replacement, the image forming apparatus 100 discharges the odor inside of the casing 10 to outside thereof, through the rear ventilation hole V10E located opposite to the front cover 11. Therefore, the image forming apparatus 100 further assures that the user is prevented from inhaling the odor.

As described above with reference to FIG. 1 to FIG. 11, the image forming apparatus 100 includes the transport device 21, in the first embodiment. When the first event is the sheet jam, the control device 27 drives the rear exhaust fan 31. In other words, when the stoppage event is the sheet jam, the image forming apparatus 100 discharges the odor inside of the casing 10 to outside thereof, through the rear ventilation hole V10E located opposite to the front cover 11. Therefore, the image forming apparatus 100 further assures that the user is prevented from inhaling the odor.

As described above with reference to FIG. 1 to FIG. 11, the front wall 10B includes the lower front opening A2, in the first embodiment. The cassette 12 is located so as to be drawn out through the lower front opening A2. The type of the event includes the second event. When the type of the event is the second event, the control device 27 drives the rear exhaust fan 31. In other words, when the stoppage event is the sheet runout, the image forming apparatus 100 discharges the odor inside of the casing 10 to outside thereof, through the rear ventilation hole V10E located opposite to the lower front opening A2 and the front cover 11. Therefore, the image forming apparatus 100 further assures that the user is prevented from inhaling the odor.

As described above with reference to FIG. 1 to FIG. 11, the image forming apparatus 100 includes the waste toner container 26, in the first embodiment. The image forming device 23 includes the photoconductor drum 2313 and the cleaning device 2314. The casing 10 includes the left wall 10C and the right wall 10D, which are spaced from each other. The left wall 10C includes the left opening A3. The right wall 10D is located opposite to the left wall 10C. The left wall 10C includes the left ventilation hole V10C. The type of the event includes the third event, which refers to the waste toner fill-up. When the type of the event is the waste toner fill-up, the control device 27 drives the right exhaust fan 33. In other words, when the stoppage event is the waste toner fill-up, the image forming apparatus 100 discharges the odor inside of the casing 10 to outside thereof, through the right ventilation hole V10D located opposite to the left cover 13. Therefore, the image forming apparatus 100 further assures that the user is prevented from inhaling the odor.

As described above with reference to FIG. 1 to FIG. 11, in the first embodiment, the control device 27 drives the rear exhaust fan 31 and the right exhaust fan 33, when the stoppage event is none of the need for unit replacement, the sheet jam, the sheet runout, and the waste toner fill-up. Thus, the image forming apparatus 100 discharges the odor inside of the casing 10 to outside thereof, through the rear ventilation hole V10E and the right ventilation hole V10D. Therefore, the image forming apparatus 100 prevents the user from inhaling the odor, despite any of the front cover 11, the cassette 12, and the left cover 13 being open.

As described above with reference to FIG. 1 to FIG. 11, the image forming apparatus 100 includes the touch display 201, in the first embodiment. Upon detecting the occurrence of the stoppage event, the control device 27 drives the selected fan, and causes the touch display 201 to display the message to the effect that the selected fan is rotating. Thus, the image forming apparatus 100 makes the user aware of the risk of inhaling the odor generated inside the casing 10. Consequently, the image forming apparatus 100 further assures that the user is prevented from inhaling the odor.

As described above with reference to FIG. 1 to FIG. 11, in the first embodiment, the control device 27 drives the selected fan upon detecting the occurrence of the stoppage event, and causes the touch display 201 to display the light image. Thus, the image forming apparatus 100 makes the user aware of the risk of inhaling the odor generated inside the casing 10. Consequently, the image forming apparatus 100 further assures that the user is prevented from inhaling the odor.

As described above with reference to FIG. 1 to FIG. 11, the image forming apparatus 100 includes the front cover detector 51, the cassette detector 52, and the left cover detector 53, in the first embodiment. Upon detecting the occurrence of the stoppage event, the control device 27 drives the selected fan at the half speed. The control device 27 decides whether any of the front cover 11, the cassette 12, and the left cover 13 has been opened, according to the output from the front cover detector 51, the cassette detector 52, and the left cover detector 53, respectively. Upon deciding that one of the front cover detector 51, the cassette detector 52, and the left cover detector 53 has detected that the corresponding component has been opened, the control device 27 drives the selected fan at the full speed. When all of the front cover 11, the cassette 12, and the left cover 13 are closed, the image forming apparatus 100 drives the selected fan at the half speed, to discharge the odor to outside of the casing 10, with low noise. In contrast, when one of the front cover 11, the cassette 12, and the left cover 13 is open, the image forming apparatus 100 drives the selected fan at the full speed, thereby suppressing the odor inside of the casing from being emitted through the upper front opening A1, the lower front opening A2, and the left opening A3. Therefore, the image forming apparatus 100 can discharge the odor inside of the casing 10, by driving the selected fan in a necessary and sufficient manner.

As described above with reference to FIG. 1 to FIG. 11, the image forming apparatus 100 includes the left suction fan 32, in the first embodiment. The control device 27 drives the left suction fan 32, while executing the printing operation. Therefore, the image forming apparatus 100 can introduce air into inside of the casing 10, thereby cooling the developing device 2312 (see FIG. 3) and related components.

For example, with the image forming apparatus according to the background art, when the user opens the front cover to fix the jam (event), the odor remaining inside the main body may be emitted to outside of the main body, through the second opening. Therefore, the user is prone to inhale the odor. With the arrangement according to the first embodiment, in contrast, the user can be prevented from inhaling the odor, as described above.

Second Embodiment

The image forming apparatus 100 according to a second embodiment will now be described, with reference to FIG. 1 to FIG. 7, and FIG. 12 to FIG. 14. The second embodiment is different from the first embodiment, in the arrangement of the exhausting operation. The following description of the second embodiment will focus on the difference from the first embodiment, and duplicating description will not be repeated.

As shown in FIG. 1 to FIG. 7, the image forming apparatus 100 according to the second embodiment includes the casing 10, the front cover 11, the cassette 12, the left cover 13, the operation panel 20, the transport device 21, the feeding device 22, the image forming device 23, the fixing device 24, the discharge device 25, the waste toner container 26, the control device 27, the communication device 28, the storage device 29, the rear exhaust fan 31, the left suction fan 32, the right exhaust fan 33, the jam detector 41, the sheet runout detector 42, the waste toner fill-up detector 43, the front cover detector 51, the cassette detector 52, and the left cover detector 53.

Figure 12:
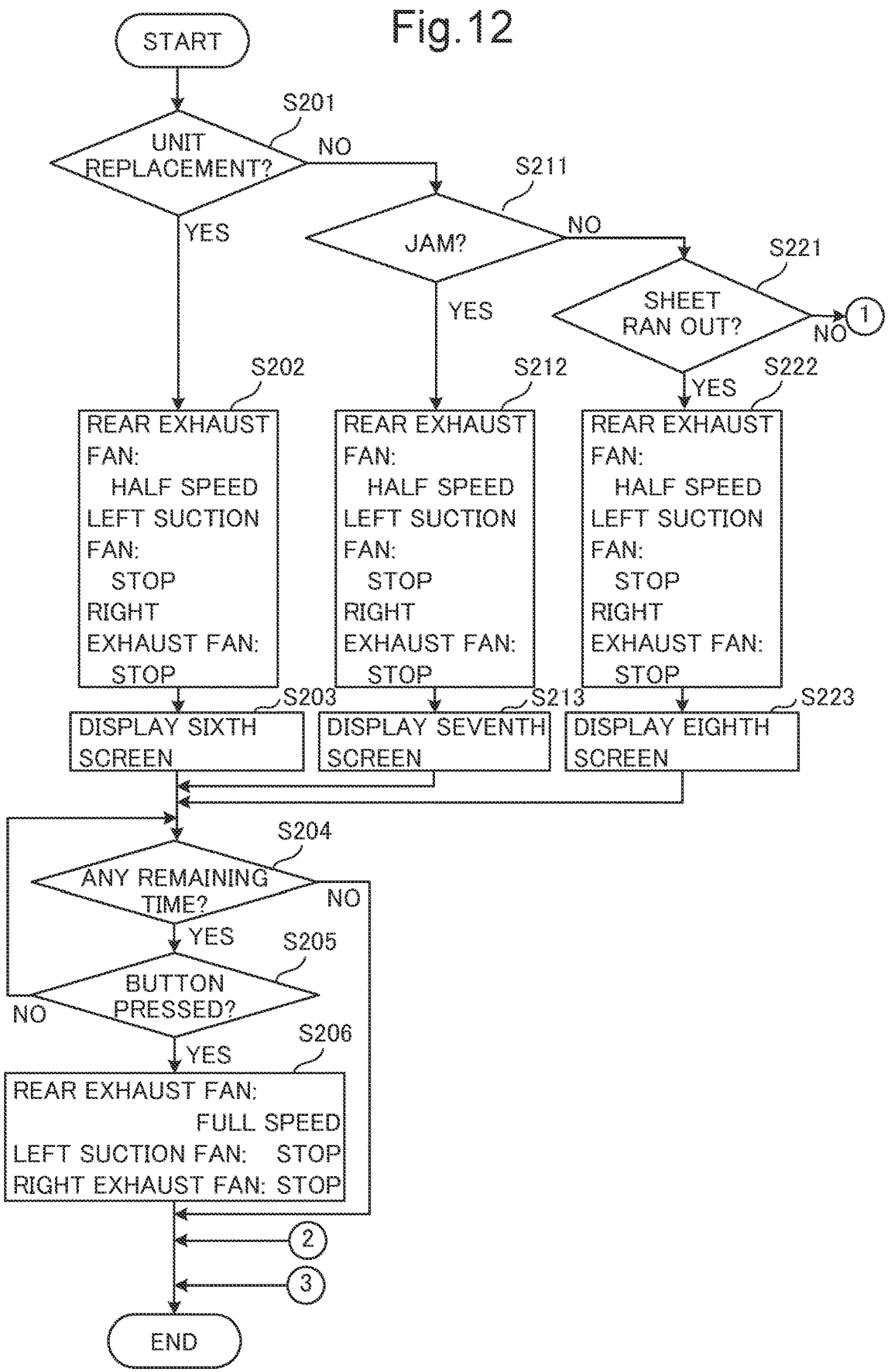
FIG. 12 is a flowchart showing a second exhausting operation performed by the image forming apparatus according to a second embodiment of the disclosure.
Figure 13:
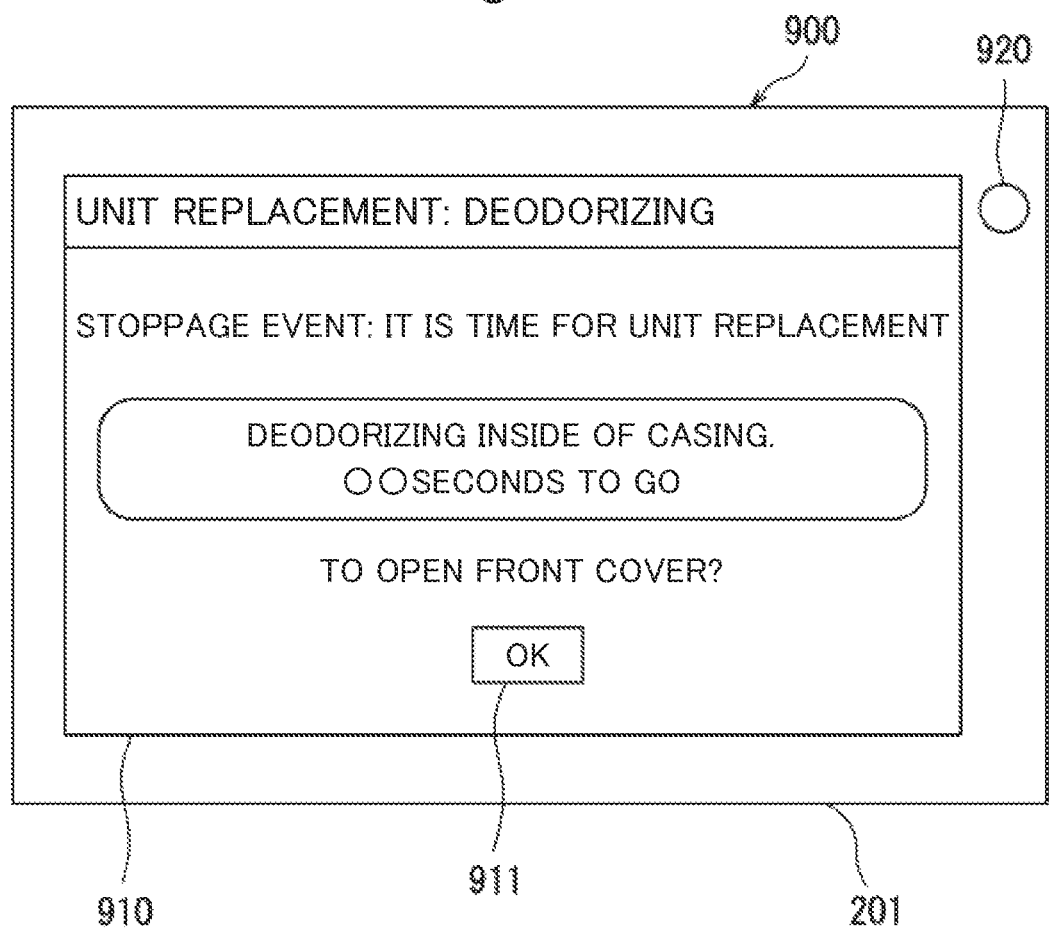
FIG. 13 is a schematic drawing showing a sixth screen according to the second embodiment of the disclosure.
Figure 14:
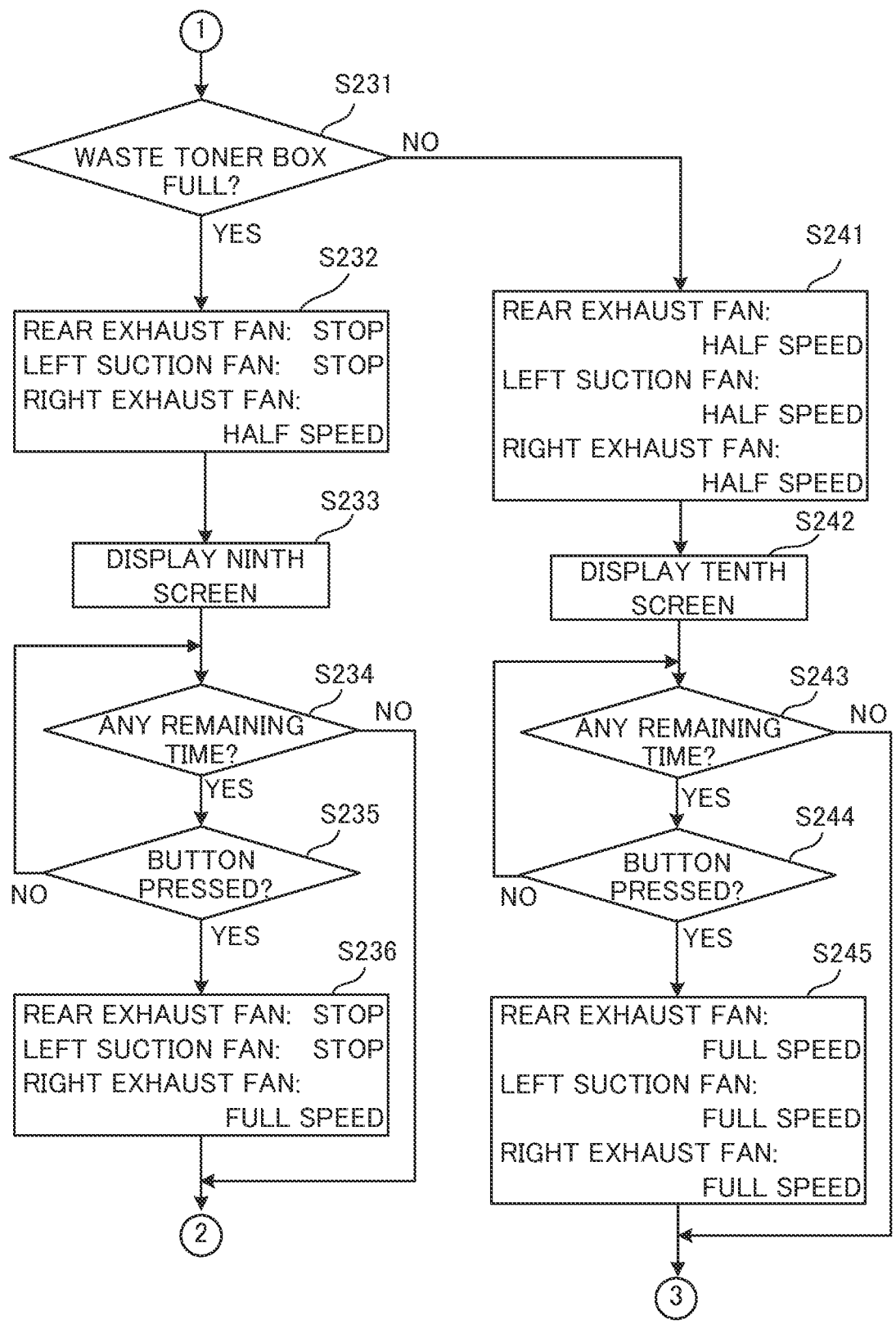
FIG. 14 is a flowchart branched from FIG. 12, showing the second exhausting operation performed by the image forming apparatus according to the second embodiment of the disclosure.

Referring to FIG. 12 to FIG. 14, a second exhausting operation performed by the control device 27 will be described hereunder. FIG. 12 and FIG. 14 are flowcharts for explaining the second exhausting operation performed by the image forming apparatus 100 according to the second embodiment. The second exhausting operation specified in FIG. 12 and FIG. 14 includes controlling the operation of each of the rear exhaust fan 31, the left suction fan 32, and the right exhaust fan 33, according to the type of the stoppage event that has occurred, and the working time of the plurality of fans. The plurality of fans include the rear exhaust fan 31, the left suction fan 32, and the right exhaust fan 33.

The second exhausting operation specified in FIG. 12 and FIG. 14 is started when a stoppage event has occurred while the image forming apparatus 100 is executing the printing operation. The control device 27 controls the left suction fan 32 so as to rotate at the third half speed, while the image forming apparatus 100 is executing the printing operation.

Step S201: As shown in FIG. 12, the control device 27 decides whether the stoppage event is the need for unit replacement. When the control device 27 decides that the stoppage event is the need for unit replacement (Yes at step S201), the operation proceeds to step S202. When the control device 27 decides that the stoppage event is not the need for unit replacement (No at step S201), the operation proceeds to step S211.

In the second embodiment, the control device 27 decides, as in the first embodiment, whether the stoppage event is the need for unit replacement, according to the cumulative number of sheets P on which the image forming apparatus 100 has executed the printing operation.

Step S202: The control device 27 controls the rear exhaust fan 31 so as to rotate at the first half speed. The control device 27 controls the left suction fan 32 so as to stop rotating. The control device 27 controls the right exhaust fan 33 so as to remain stopped. Thus, the control device 27 selects the rear exhaust fan 31 and causes the rear exhaust fan 31 to rotate, when the stoppage event is decided to be the need for unit replacement. Then the operation proceeds to step S203.

In the second embodiment, the control device 27 determines a preset time, on the basis of image forming job data. The control device 27 drives the rear exhaust fan 31, until the preset time elapses after the rear exhaust fan 31 started rotating. In other words, the preset time refers to the time that the rear exhaust fan 31 is to stop rotating. To be more detailed, the control device 27 determines the preset time, on the basis of the number of copies, the coverage rate, and the type of the sheet P. The coverage rate refers to the ratio of cumulative area (XB) of the image formed on the sheet P, to the area XA of the sheet P (XB/XA).

Step S203: The control device 27 causes the touch display 201 to display a sixth screen 900. The sixth screen 900 refers to the screen displaying a message to the effect that the rear exhaust fan 31 is rotating. Then the operation proceeds to step S204.

Referring to FIG. 13, the sixth screen 900 will be described hereunder. FIG. 13 illustrates the sixth screen 900 according to the second embodiment. As shown in FIG. 13, the sixth screen 900 includes a second message image 910 and a second light image 920. The second message image 910 represents a message to the effect that the stoppage event is the need for unit replacement, and a remaining time. The remaining time refers to the time left before the preset time, counted from the time that the rear exhaust fan 31 started rotating, is reached. The control device 27 measures the remaining time with the lapse of time, on the basis of the preset time. The second message image 910 also includes a confirmation button image 911. The confirmation button image 911 refers to the image urging the user to confirm whether the user intends to open the front cover 11. Upon detecting that the confirmation button image 911 has been pressed, the control device 27 performs the operation of step S205, as will be subsequently described. The second light image 920 blinks while the rear exhaust fan 31 is rotating. The user can recognize that the rear exhaust fan 31 is rotating, in view of the blinking of the second light image 920. The confirmation button image 911 exemplifies the selected image in the disclosure.

Step S204: The control device 27 decides whether any time remains before the preset time is reached. In other words, the control device 27 decides whether the remaining time is 0 seconds. When the control device 27 decides that the time remains (Yes at step S204), the operation proceeds to step S205. When the control device 27 decides that no time remains (No at step S204), the operation is finished.

Step S205: The control device 27 decides whether the touch display 201 has detected the press of the confirmation button image 911. When the control device 27 decides that the touch display 201 has detected the press of the confirmation button image 911 (Yes at step S205), the operation proceeds to step S206. When the control device 27 decides that the touch display 201 has not detected the press of the confirmation button image 911 (No at step S205), the operation returns to step S204.

Step S206: The control device 27 controls the rear exhaust fan 31 so as to rotate at the first full speed. The control device 27 controls the left suction fan 32 and the right exhaust fan 33, so as to remain stopped. Then the operation is finished.

Step S211: The control device 27 decides whether the stoppage event is the sheet jam, according to the output from the jam detector 41. When the control device 27 decides that the stoppage event is the sheet jam (Yes at step S211), the operation proceeds to step S212. When the control device 27 decides that the stoppage event is not the sheet jam (No at step S211), the operation proceeds to step S221.

Step S212: The control device 27 controls the rear exhaust fan 31 so as to rotate at the first half speed. The control device 27 controls the left suction fan 32 so as to stop rotating. The control device 27 controls the right exhaust fan 33 so as to remain stopped. The control device 27 selects the rear exhaust fan 31 and drives the same, upon deciding that the stoppage event is the sheet jam. Then the operation proceeds to step S213.

Step S213: The control device 27 causes the touch display 201 to display a seventh screen. The seventh screen refers, like the sixth screen 900 shown in FIG. 13, to the screen displaying a message to the effect that the rear exhaust fan 31 is rotating. Then the operation proceeds to step S204.

Step S221: The control device 27 decides whether the stoppage event is the sheet runout, according to the output from the sheet runout detector 42. When the control device 27 decides that the stoppage event is the sheet runout (Yes at step S221), the operation proceeds to step S222. When the control device 27 decides that the stoppage event is not the sheet runout (No at step S221), the operation proceeds to step S231.

Step S222: The control device 27 controls the rear exhaust fan 31 so as to rotate at the first half speed. The control device 27 controls the left suction fan 32 so as to stop rotating. The control device 27 controls the right exhaust fan 33 so as to remain stopped. The control device 27 selects the rear exhaust fan 31 and drives the same, upon deciding that the stoppage event is the sheet runout. Then the operation proceeds to step S223.

Step S223: The control device 27 causes the touch display 201 to display an eighth screen. The eighth screen refers, like the sixth screen 900 shown in FIG. 13, to the screen displaying a message to the effect that the rear exhaust fan 31 is rotating. Then the operation proceeds to step S204.

Step S231: As shown in FIG. 14, the control device 27 decides whether the stoppage event is the waste toner fill-up, according to the output from the waste toner fill-up detector 43. When the control device 27 decides that the stoppage event is the waste toner fill-up (Yes at step S231), the operation proceeds to step S232. When the control device 27 decides that the stoppage event is not the waste toner fill-up (No at step S231), in other words when the stoppage event is none of the need for unit replacement, the sheet jam, the sheet runout, and the waste toner fill-up, the operation proceeds to step S241.

Step S232: The control device 27 controls the rear exhaust fan 31 so as to remain stopped. The control device 27 controls the left suction fan 32 so as to stop rotating. The control device 27 controls the right exhaust fan 33 so as to rotate at the second half speed. Thus, the control device 27 selects the right exhaust fan 33 and drives the same, upon deciding that the stoppage event is the waste toner fill-up. Then the operation proceeds to step S233.

Step S233: The control device 27 causes the touch display 201 to display a ninth screen. The ninth screen refers, like the sixth screen 900 shown in FIG. 13, to the screen displaying a message to the effect that the right exhaust fan 33 is rotating. Then the operation proceeds to step S234.

Step S234: The control device 27 decides whether any time remains before the preset time is reached. When the control device 27 decides that the time remains (Yes at step S234), the operation proceeds to step S235. When the control device 27 decides that no time remains (No at step S234), the operation is finished.

Step S235: The control device 27 decides whether the touch display 201 has detected the press of the confirmation button image 911. When the control device 27 decides that the touch display 201 has detected the press of the confirmation button image 911 (Yes at step S235), the operation proceeds to step S236. When the control device 27 decides that the touch display 201 has not detected the press of the confirmation button image 911 (No at step S235), the operation returns to step S234.

Step S236: The control device 27 controls the rear exhaust fan 31 and the left suction fan 32, so as to remain stopped. The control device 27 controls the right exhaust fan 33 so as to rotate at the second full speed. Then the operation is finished.

Step S241: The control device 27 controls the rear exhaust fan 31 so as to rotate at the first half speed. The control device 27 controls the left suction fan 32 so as to keep rotating at the third half speed. The control device 27 controls the right exhaust fan 33 so as to rotate at the second half speed.

Step S242: The control device 27 causes the touch display 201 to display a tenth screen. The tenth screen refers, like the sixth screen 900 shown in FIG. 13, to the screen displaying a message to the effect that the right exhaust fan 33 is rotating. Then the operation proceeds to step S243.

Step S243: The control device 27 decides whether any time remains before the preset time is reached. When the control device 27 decides that the time remains (Yes at step S243), the operation proceeds to step S244. When the control device 27 decides that no time remains (No at step S243), the operation is finished.

Step S244: The control device 27 decides whether the touch display 201 has detected the press of the confirmation button image 911. When the control device 27 decides that the touch display 201 has detected the press of the confirmation button image 911 (Yes at step S244), the operation proceeds to step S245. When the control device 27 decides that the touch display 201 has not detected the press of the confirmation button image 911 (No at step S244), the operation returns to step S243.

Step S245: The control device 27 controls the rear exhaust fan 31 so as to rotate at the first full speed. The control device 27 controls the left suction fan 32 so as to keep rotating at the third full speed. The control device 27 controls the right exhaust fan 33 so as to rotate at the second full speed. Then the operation is finished.

As described above with reference to FIG. 1 to FIG. 7, and FIG. 12 to FIG. 14, the image forming apparatus 100 prints an image on the sheet P, in the second embodiment. The image forming apparatus 100 includes the casing 10, the front cover 11, the cassette 12, the left cover 13, the rear exhaust fan 31, the right exhaust fan 33, and the control device 27. The casing 10 includes the upper front opening A1, the lower front opening A2, and the left opening A3. The front cover 11 is attached to the casing 10 so as to open and close the upper front opening A1. The cassette 12 is mounted in the casing 10, so as to open and close the lower front opening A2. The left cover 13 is attached to the casing 10 so as to open and close the left opening A3. The casing 10 includes the rear ventilation hole V10E and the right ventilation hole V10D. The control device 27 detects the occurrence of a stoppage event, and identifies the type of the stoppage event. The control device 27 selects one of the rear exhaust fan 31 and the right exhaust fan 33, according to the type of the stoppage event. Hereinafter, one of the rear exhaust fan 31 and the right exhaust fan 33 that has been selected will be referred to as "selected fan". The control device 27 drives the selected fan. Consequently, the image forming apparatus 100 prevents the user from inhaling the odor.

As described above with reference to FIG. 1 to FIG. 7, and FIG. 12 to FIG. 14, the image forming apparatus 100 includes the touch display 201, in the second embodiment. The control device 27 drives the selected fan for the preset time, upon detecting the occurrence of the stoppage event. The control device 27 causes the touch display 201 to display the remaining time. Accordingly, the user can be made aware of the timing that the front cover 11, the cassette 12, or the left cover 13 should be opened, to keep from inhaling the odor generated inside the casing 10. Consequently, the image forming apparatus 100 can secure, when the user is to fix the stoppage event, a necessary and sufficient standby time for the user to keep from inhaling the odor generated inside the casing 10.

As described above with reference to FIG. 1 to FIG. 7, and FIG. 12 to FIG. 14, in the second embodiment, the control device 27 drives the selected fan at the half speed, upon detecting the occurrence of the stoppage event. The control device 27 causes the touch display 201 to display the confirmation button image 911. The control device 27 decides whether the confirmation button image 911 has been pressed. Upon deciding that the confirmation button image 911 has been pressed, the control device 27 drives the selected fan at the full speed. Accordingly, when the user of the image forming apparatus 100 opens one of the front cover 11, the cassette 12, and the left cover 13 to fix the stoppage event, the odor inside of the casing 10 is prevented from being discharged through the upper front opening A1, the lower front opening A2, and the left opening A3. Consequently, the image forming apparatus 100 further assures that the user is prevented from inhaling the odor.

Although the embodiments of the disclosure have thus far been described with reference to FIG. 1 to FIG. 14, the disclosure is in no way limited to the foregoing embodiments, but may be modified in various manners without departing from the scope of the disclosure, such as the cases (1) to (7) described hereunder. The drawings schematically represent the essential constituent elements for the sake of clarity, and the thickness, length, and the number of pieces of the illustrated elements may be different from the actual ones. Further, the material, the shape, and the dimensions of the elements referred to in the foregoing embodiments are merely exemplary, and may be modified as desired, provided that the intended advantageous effects of the disclosure can be substantially attained.

(1) As described above with reference to FIG. 1 to FIG. 14, in the first and second embodiments, the stoppage event includes the need for unit replacement, the sheet jam, the sheet runout, and the waste toner fill-up. However, the stoppage event may be defined differently. For example, the stoppage event may include at least one of the need for unit replacement, the sheet jam, the sheet runout, and the waste toner fill-up.

(2) As described above with reference to FIG. 1 to FIG. 14, in the first and second embodiments, the control device 27 causes the touch display 201 to display the message to the effect that the selected fan is rotating. However, the disclosure is not limited to such an arrangement. It is not mandatory that the control device 27 causes the touch display 201 to display the message to the effect that the selected fan is rotating.

(3) As described above with reference to FIG. 1 to FIG. 14, in the first and second embodiments, the operation panel 20 includes the touch display 201. However, the disclosure is not limited to such a configuration. The operation panel 20 may be without the touch display 201, or may be an LCD without the touch sensor.

(4) As described above with reference to FIG. 1 to FIG. 11, the first screen 800 includes the first light image 820, in the first embodiment. However, the disclosure is not limited to such a configuration. For example, the first screen 800 may be without the first light image 820. Further, as described above with reference to FIG. 1 to FIG. 7, and FIG. 12 to FIG. 14, the sixth screen 900 includes the second light image 920, in the second embodiment. However, the disclosure is not limited to such a configuration. The sixth screen 900 may be without the second light image 920.

(5) As described above with reference to FIG. 1 to FIG. 11, the first light image 820 is configured to blink in the first embodiment. However, the disclosure is not limited to such a configuration. For example, the first light image 820 may be configured to be continuously lit. Further, as described above with reference to FIG. 1 to FIG. 7, and FIG. 12 to FIG. 14, the second light image 920 is configured to blink in the second embodiment. However, the disclosure is not limited to such a configuration. The second light image 920 may be configured to be continuously lit.

(6) As described above with reference to FIG. 1 to FIG. 11, in the first embodiment, the image forming apparatus 100 drives the selected fan at the full speed, when one of the front cover 11, the cassette 12, and the left cover 13 is open. However, the disclosure is not limited to such an arrangement. For example, the image forming apparatus 100 may keep driving the selected fan at the half speed, when one of the front cover 11, the cassette 12, and the left cover 13 is open.

(7) As described above with reference to FIG. 1 to FIG. 7, and FIG. 12 to FIG. 14, in the second embodiment, the image forming apparatus 100 drives the selected fan for the preset time, upon detecting the stoppage event. However, the disclosure is not limited to such an arrangement. For example, the image forming apparatus 100 may drive the selected fan upon detecting the stoppage event, until an instruction to stop driving the selected fan is inputted through the operation panel 20.

INDUSTRIAL APPLICABILITY

The disclosure is applicable to the technical field of the image forming apparatus.

While the present disclosure has been described in detail with reference to the embodiments thereof, it would be apparent to those skilled in the art the various changes and modifications may be made therein within the scope defined by the appended claims.

What is claimed is:

1. An image forming apparatus that executes an image printing operation on a sheet, comprising:
  a casing including a plurality of openings and a plurality of ventilation holes;
  a plurality of open/close devices attached to the casing, and configured to open and close the respectively corresponding openings;
  a plurality of fans that each generate an airflow from inside of the casing to a corresponding one of the plurality of ventilation holes; and
  a control device that controls operation of the plurality of fans, the control device being configured to:
    detect an occurrence of an event that restricts execution of the printing;
    identify a type of the event;
    select at least one of the plurality of fans according to the type of the event; and
    drive the selected fan,
  wherein the plurality of openings include a first opening,
  the plurality of ventilation holes include a first ventilation hole,
  the casing includes a first wall and a second wall spaced from each other,
  the first wall includes the first opening,
  the second wall is located opposite to the first wall, and includes the first ventilation hole,
  the plurality of open/close devices include a first cover configured to open and close the first opening,
  the plurality of fans include a first fan that generates an airflow from inside of the casing toward the first ventilation hole,
  the type of the event includes a first event that requires the first cover to be opened, and
  the control device drives the first fan, when the type of the event is the first event, and
  wherein the plurality of openings include a second opening,
  the first wall includes the second opening,
  the plurality of open/close devices include a cassette for accommodating the sheet,
  the cassette is located so as to be drawn out through the second opening,
  the type of the event includes a second event that requires the cassette to be drawn out, and
  the control device drives the first fan, when the type of the event is the second event.

2. An image forming apparatus that executes an image printing operation on a sheet, comprising:
  a casing including a plurality of openings and a plurality of ventilation holes;
  a plurality of open/close devices attached to the casing, and configured to open and close the respectively corresponding openings;
  a plurality of fans that each generate an airflow from inside of the casing to a corresponding one of the plurality of ventilation holes; and
  a control device that controls operation of the plurality of fans, the control device being configured to:
    detect an occurrence of an event that restricts execution of the printing;
    identify a type of the event;
    select at least one of the plurality of fans according to the type of the event; and
    drive the selected fan, wherein the plurality of openings include a first opening,
the plurality of ventilation holes include a first ventilation hole,
the casing includes a first wall and a second wall spaced from each other,
the first wall includes the first opening,
the second wall is located opposite to the first wall, and includes the first ventilation hole,
the plurality of open/close devices include a first cover configured to open and close the first opening,
the plurality of fans include a first fan that generates an airflow from inside of the casing toward the first ventilation hole,
the type of the event includes a first event that requires the first cover to be opened, and
the control device drives the first fan, when the type of the event is the first event, and
the image forming apparatus further comprising:
an image forming device that forms an image on the sheet with a tone; and
a waste toner container,
wherein the image forming device includes:
an image carrier; and
a cleaning device that removes the toner remaining on the image carrier,
the waste toner container receives waste toner removed by the cleaning device from the image carrier,
the plurality of openings include a third opening,
the plurality of ventilation holes include a second ventilation hole,
the casing includes a third wall and a fourth wall spaced from each other,
the third wall includes the third opening,
the fourth wall is located opposite to the third wall, and includes the second ventilation hole,
the plurality of open/close devices include a second cover configured to open and close the third opening,
the plurality of fans include a second fan that generates an airflow from inside of the casing toward the second ventilation hole,
the type of the event includes a third event that requires the second cover to be opened,
the third event includes waste toner fill-up, where the waste toner container is filled up with the waste toner, and
the control device drives the second fan, when the type of the event is the third event.

3. The image forming apparatus according to claim 2, wherein the control device drives both of the first fan and the second fan, when the waste toner container is not filled up with the waste toner, and the type of the event is neither of the first event and the third event.

4. The image forming apparatus according to claim 2, wherein the control device drives the first fan and the second fan, according to the type of the event.

5. An image forming apparatus that executes an image printing operation on a sheet, comprising:
a casing including a plurality of openings and a plurality of ventilation holes;
a plurality of open/close devices attached to the casing, and configured to open and close the respectively corresponding openings;
a plurality of fans that each generate an airflow from inside of the casing to a corresponding one of the plurality of ventilation holes; and
a control device that controls operation of the plurality of fans, the control device being configured to:
detect an occurrence of an event that restricts execution of the printing;
identify a type of the event;
select at least one of the plurality of fans according to the type of the event; and
drive the selected fan, and
the image forming apparatus further comprising a touch display that displays information,
wherein the control device causes the touch display, upon detecting the occurrence of the event and driving the fan, to display a selection image for urging a user to respond whether the user intends to open the open/close device.

6. The image forming apparatus according to claim 1, wherein the control device is configured to:
drive the fan selected upon detecting the occurrence of the event, at a first rotation speed;
cause the touch display to display the selection image;
decide whether the selection image has been pressed; and
drive the fan at a second rotation speed faster than the first rotation speed, upon deciding that the selection image has been pressed.

* * * * *